(12) United States Patent
Suzuki et al.

(10) Patent No.: US 9,352,939 B2
(45) Date of Patent: May 31, 2016

(54) CRANE OPERATION ASSISTANCE SYSTEM

(71) Applicant: TOSHIBA MITSUBISHI-ELECTRIC INDUSTRIAL SYSTEMS CORPORATION, Tokyo (JP)

(72) Inventors: Norihiro Suzuki, Tokyo (JP); Daisuke Nakamura, Tokyo (JP); Kenji Kijima, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 0 days.

(21) Appl. No.: 14/441,653

(22) PCT Filed: Nov. 27, 2012

(86) PCT No.: PCT/JP2012/080617
§ 371 (c)(1),
(2) Date: May 8, 2015

(87) PCT Pub. No.: WO2014/083611
PCT Pub. Date: Jun. 5, 2014

(65) Prior Publication Data
US 2015/0307330 A1    Oct. 29, 2015

(51) Int. Cl.
*B66C 13/08*    (2006.01)
*B66C 15/04*    (2006.01)
(Continued)

(52) U.S. Cl.
CPC ............. *B66C 13/08* (2013.01); *B66C 13/23* (2013.01); *B66C 13/46* (2013.01); *B66C 13/48* (2013.01); *B66C 15/045* (2013.01); *B66C 19/007* (2013.01); *G01B 21/16* (2013.01)

(58) Field of Classification Search
CPC ...... B66C 13/08; B66C 13/085; B66C 13/22; B66C 13/23; B66C 13/30; B66C 13/46; B66C 15/04; B66C 15/045; B66C 13/04; B66C 13/48; B66C 19/002; B66C 19/007; G01B 21/16; G01B 21/18; G01B 21/11; G01B 21/23; G01B 21/26
See application file for complete search history.

(56) References Cited

U.S. PATENT DOCUMENTS 4,753,357 A * 6/1988 Miyoshi .................. B66C 13/46
                                                         212/286
5,343,739 A * 9/1994 Curry .................... B66C 19/002
                                                         212/276

(Continued)

FOREIGN PATENT DOCUMENTS

JP    2000 169079    6/2000
JP    2003 026388    1/2003

(Continued)

OTHER PUBLICATIONS

International Search Report issued Mar. 5, 2013 in PCT/JP12/080617 filed Nov. 27, 2012.

*Primary Examiner* — Thomas G Black
*Assistant Examiner* — Ce Li
(74) *Attorney, Agent, or Firm* — Oblon, McClelland, Maier & Neustadt, L.L.P.

(57) ABSTRACT

A crane operation assistance system includes: a scanning-type distance meter capable of measuring a distance and an angle between the distance meter and an object under a range of movement of a movable body that can hoist a container and move in a horizontal direction; and object height distribution data making means for making, based on the information measured by the distance meter, object height distribution data that is data indicating a distribution of heights of objects under the range of movement of the movable body. If a blind spot for the distance meter has occurred, the object height distribution data making means revises data of object heights in the zone of the blind spot based on data of an object height at a point that is farthest from the distance meter in a imaginary containers presence zone having an overlap with the zone of the blind spot.

12 Claims, 17 Drawing Sheets

(51) Int. Cl.
*B66C 19/00* (2006.01)
*B66C 13/46* (2006.01)
*B66C 13/23* (2006.01)
*G01B 21/16* (2006.01)
*B66C 13/48* (2006.01)

(56) References Cited

U.S. PATENT DOCUMENTS

| | | | | |
|---|---|---|---|---|
| 6,648,156 | B1 * | 11/2003 | Bryfors | B66C 15/045 |
| | | | | 212/270 |
| 7,289,876 | B2 * | 10/2007 | Lussen | B66C 13/46 |
| | | | | 212/275 |
| 9,150,389 | B2 * | 10/2015 | Rintanen | B66C 13/46 |
| 2002/0024598 | A1 * | 2/2002 | Kunimitsu | B66C 13/46 |
| | | | | 348/159 |
| 2005/0281644 | A1 * | 12/2005 | Lussen | B66C 13/46 |
| | | | | 414/403 |
| 2011/0199099 | A1 * | 8/2011 | Kato | B66C 13/46 |
| | | | | 324/642 |
| 2012/0092643 | A1 * | 4/2012 | Rintanen | B66C 13/46 |
| | | | | 356/4.01 |

FOREIGN PATENT DOCUMENTS

| | | |
|---|---|---|
| JP | 2003 146579 | 5/2003 |
| JP | 2005 104665 | 4/2005 |

\* cited by examiner

FIG. 4
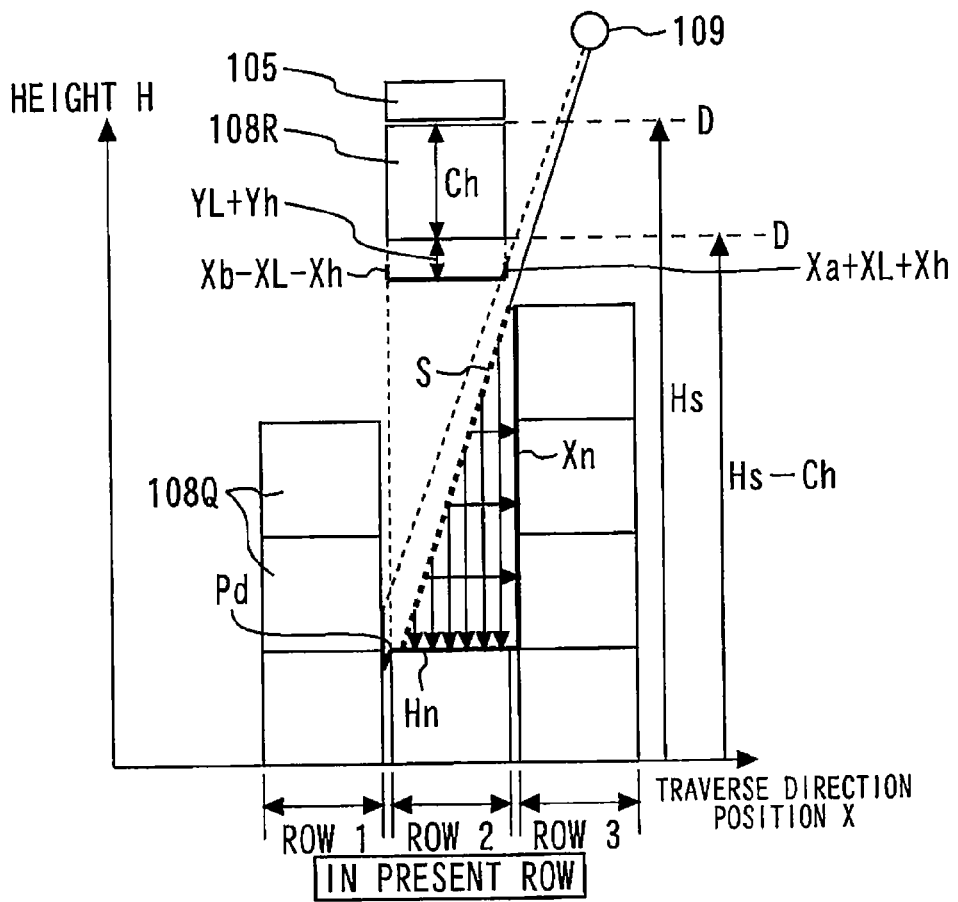
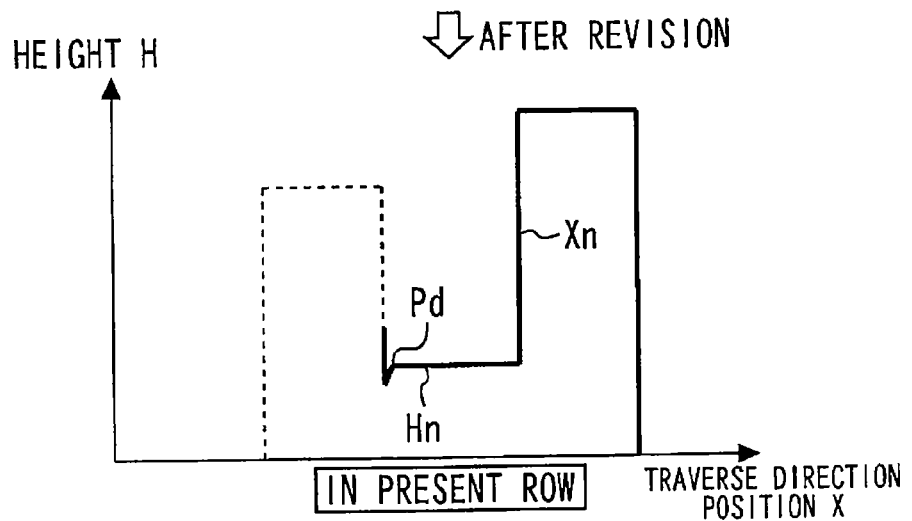

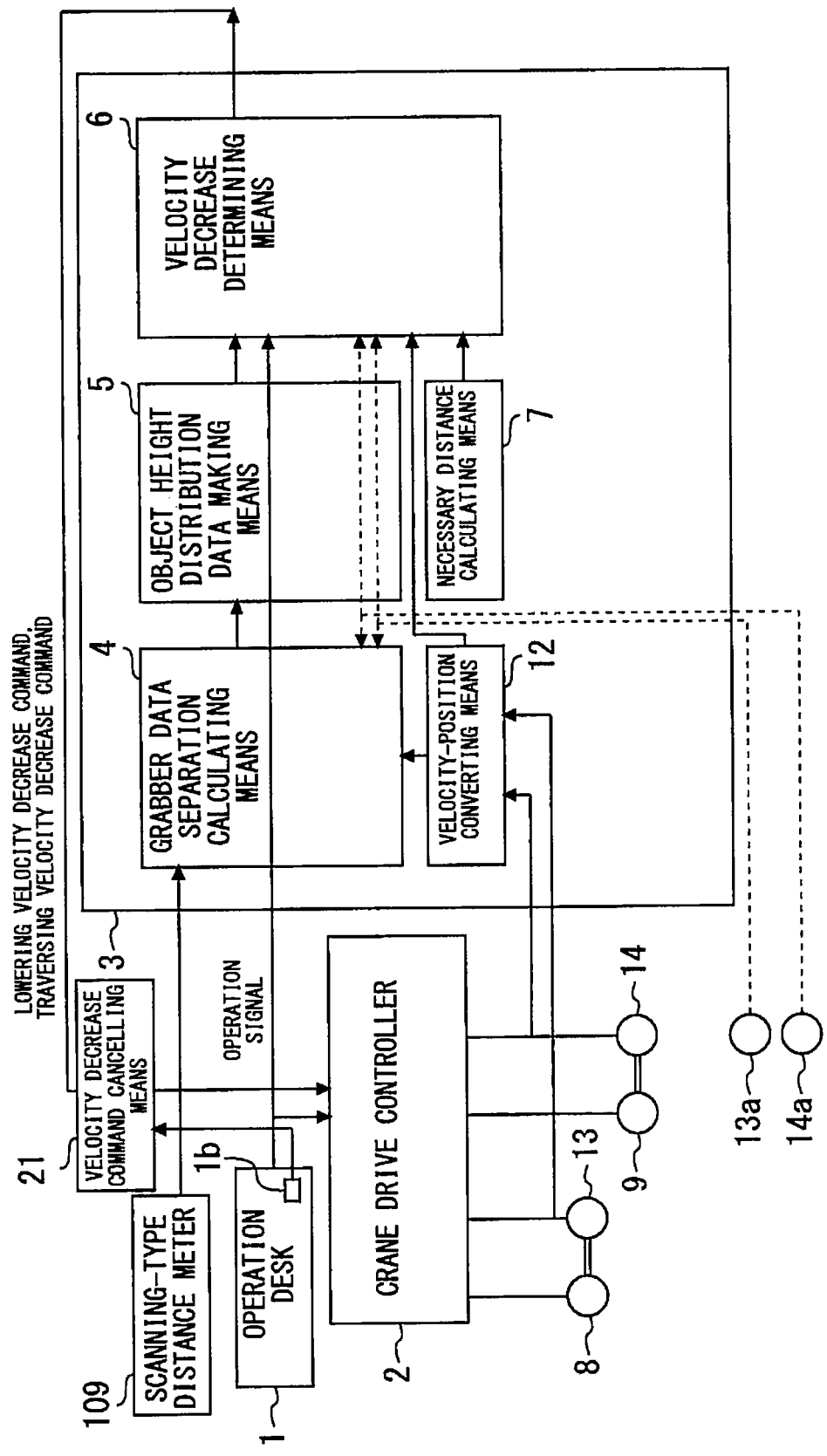

CRANE OPERATION ASSISTANCE SYSTEM

TECHNICAL FIELD

The present invention relates to a crane operation assistance system that assists operation of a crane including a movable body capable of hoisting a container and moving in a horizontal direction.

BACKGROUND ART

For port crane facilities and the like including a movable body such as a trolley that hoists a container and traverses, techniques are known that, in order to avoid a collision between a container or a container-grabber that is lowering or traversing while being hung from the movable body and an object that is liable to come into contact with the container or the container-grabber, achieve low-impact landing, or prevent a collapse of stacked containers due to the container or the container-grabber transversely hitting the object, detect the position of the object via a sensor and automatically decrease the velocity of the lowering or the traversing.

Japanese Patent Laid-Open No. 2005-104665 discloses a container collision prevention system in which a two-dimensional laser sensor having a sectorial detection range in a traverse movement direction is attached to a part of a movable body, the part capable of ensuring a view of a lower edge portion of a container hoisted with a container-grabber, the sensor performs scanning in the traverse movement direction, and control means for controlling a position to which the container is moved, based on data on a position of the lower edge portion of the hoisted container and data on a position of an upper edge of placed containers is provided.

CITATION LIST

Patent Literature

Patent Literature 1: Japanese Patent Laid-Open No. 2005-104665

SUMMARY OF INVENTION

Technical Problem

The conventional technique disclosed in the aforementioned publication has the following problems. In container yards, in order to hold as many containers as possible, containers are stacked as high as possible. Thus, the highly-stacked containers cause a blind spot for a scanning-type distance meter such as a two-dimensional laser sensor, which may result in failure to detect an upper edge of a placed container. Such zone of the blind spot may hinder a proper automatic velocity decrease of the container or the container-grabber that is lowering or traversing. Also, in some cases, an automatic velocity decrease is started at a position that is unnecessarily back, which increases time required for movement of the container or the container-grabber and thus results in operation efficiency decrease.

The present invention has been made to solve problems as mentioned above, and an object of the present invention is to provide a crane operation assistance system that enables suppression of operation efficiency decrease even where a blind spot for a scanning-type distance meter occurs.

Solution to Problem

A crane operation assistance system of the invention is assists operation of a crane including a movable body capable of hoisting a container and moving in a horizontal direction. The system comprises: a scanning-type distance meter mounted on the movable body, the scanning-type distance meter being capable of measuring a distance and an angle between the scanning-type distance meter and an object under a range of movement of the movable body; and object height distribution data making means for making, based on information measured by the scanning-type distance meter, object height distribution data that is data indicating a distribution of heights of objects under the range of movement of the movable body. If a blind spot for the scanning-type distance meter has occurred in the made object height distribution data, the object height distribution data making means revises data of object heights in a zone of the blind spot based on data of an object height at a point that is farthest from the scanning-type distance meter in a imaginary containers presence zone having an overlap with the zone of the blind spot.

Advantageous Effect of Invention

A crane operation assistance system according to the present invention enables suppression of operation efficiency decrease even where a blind spot for the scanning-type distance meter occurs.

BRIEF DESCRIPTION OF DRAWINGS

FIG. 4 is a diagram for describing automatic velocity decrease and object height distribution data revision.

FIG. 17 is a block diagram illustrating a crane control system to which a crane operation assistance system according to Embodiment 10 of the present invention has been applied.

DESCRIPTION OF EMBODIMENTS

Figure 1:
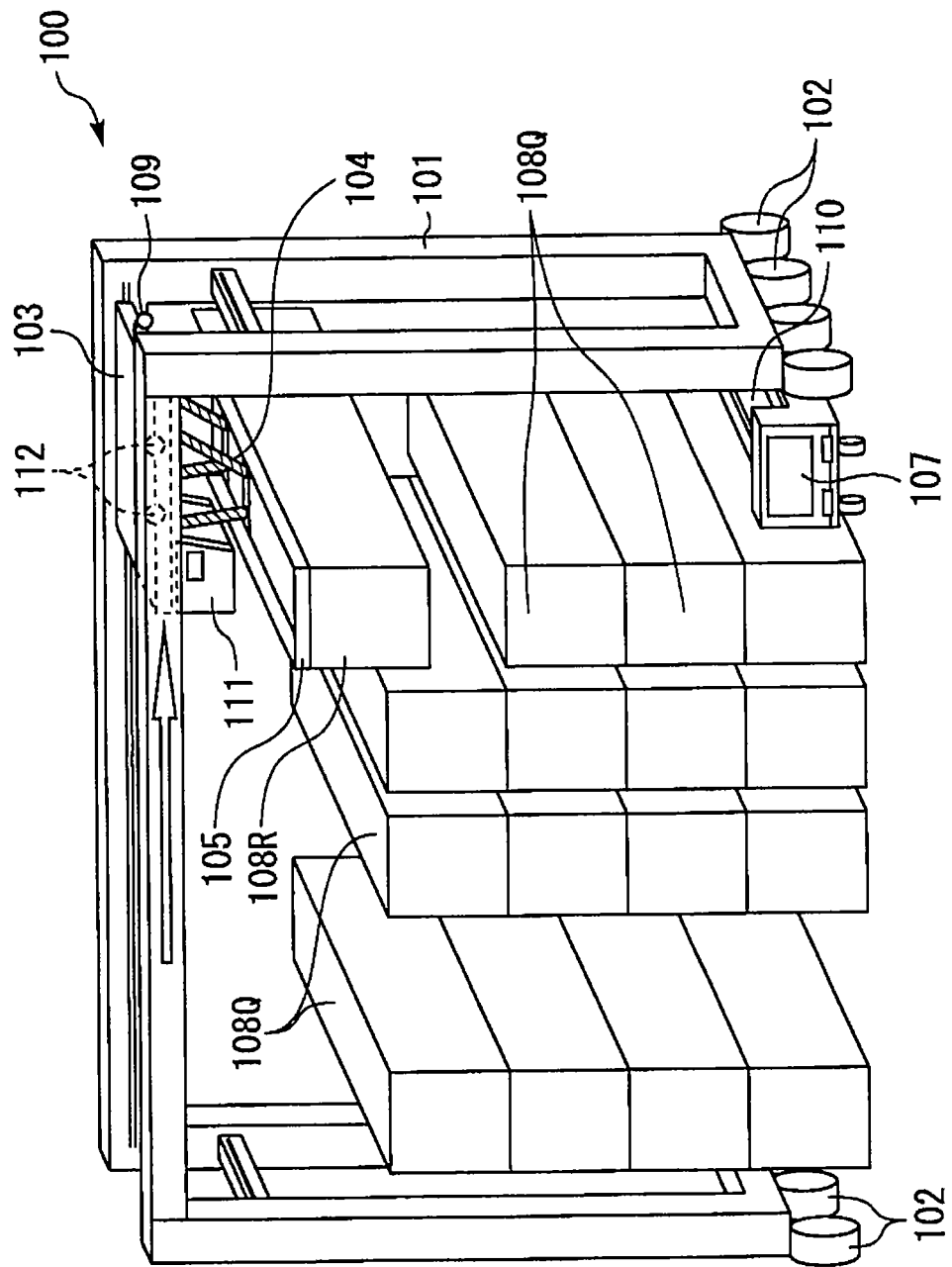
FIG. 1 is a perspective diagram illustrating a crane to which a crane operation assistance system according to Embodiment 1 of the present invention has been applied.

Now, with reference to the drawings, embodiments of the present invention will be described. In the drawings, common components are denoted by the same reference numerals, and overlapping descriptions will be omitted. Note that the present invention includes all of combinations of the respective embodiments indicated below.

Embodiment 1

Figure 2:
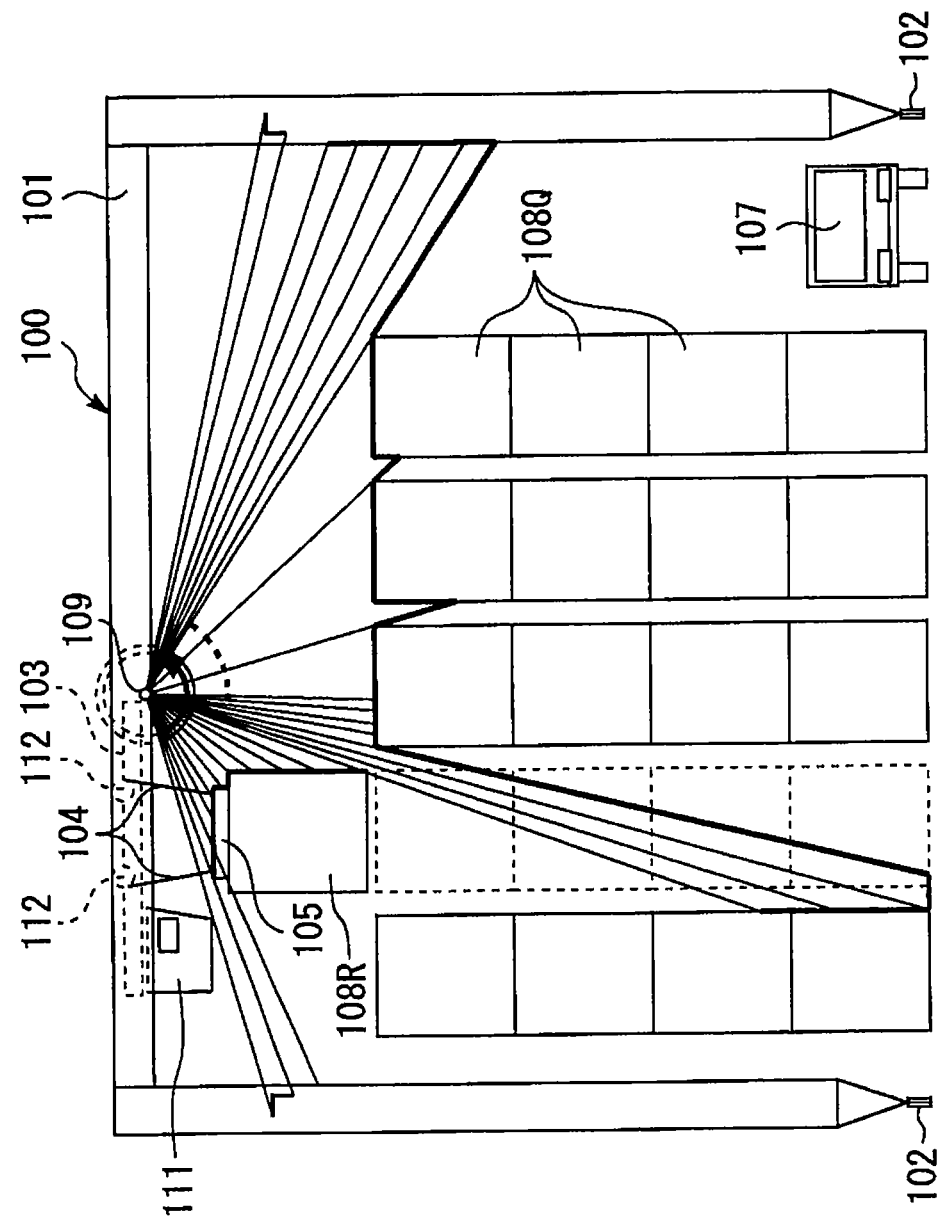
FIG. 2 is a front view of the crane illustrated in FIG. 1.

FIG. 1 is a perspective diagram illustrating a crane to which a crane operation assistance system according to Embodiment 1 of the present invention has been applied. FIG. 2 is a front view of the crane 100 illustrated in FIG. 1. The crane 100 in the present embodiment is used in a container yard in which rectangular parallelepiped containers 108 are collected and stored. In the below description, a container 108 hung from the crane 100 is referred to as "container 108R", container(s) placed in the container yard are referred to as "container(s) 108Q", and if there is no specific distinction therebetween, the container(s) are collectively referred to as "container(s) 108".

As illustrated in FIGS. 1 and 2, in the container yard, containers 108Q can be placed in such a manner that the containers 108Q are arranged in a plurality of rows (five rows in the illustrated configuration) and stacked in a plurality of tiers (four tiers in the illustrated configuration). Each of the containers 108 is loaded on a bed 110 of a truck 107, and carried into the container yard or carried out of the container yard. In the container yard, a lane on which the truck 107 can run is provided adjacent to a space in which the containers 108Q are placed and in parallel to a direction of the rows of the containers 108Q (that is, a longitudinal direction of the containers 108Q).

The crane 100 includes a gate-shaped frame 101 that straddles the containers 108Q collected in the container yard and the running lane for the truck 107, a plurality of running wheels 102 that enable the frame 101 to move in the direction of the rows of the containers 108Q, and a movable body 103 that can move along traverse girders of the frame 101 in a horizontal direction. The movable body 103 can move straight in a direction perpendicular to the direction of the rows of the container 108Q, above the containers 108Q collected in the container yard. In the below description, a direction parallel to a direction of movement of the movable body 103 is referred to as "traverse direction". Also, a movement in the traverse direction is referred to as "traversing".

On the movable body 103, an operation room 111, wind-up drums 112, which are driven by a hoisting motor 8, and a scanning-type distance meter 109 are mounted. From the wind-up drum 112, a container-grabber 105 such as a spreader that can grab and release the container 108 is hung via wire ropes 104. The wind-up drums 112 can lift the container-grabber 105 by winding the wire ropes 104 up, and lower the container-grabber 105 by paying the wire ropes 104 out. The operation room 111 is disposed at a position that does not overlap an area that is vertically above the container-grabber 105. The scanning-type distance meter 109 is disposed at a position that does not overlap the area that vertically above the container-grabber 105. In the present embodiment, the operation room 111 and the scanning-type distance meter 109 are disposed on sides that are opposite to each other across the position that is vertically above the container-grabber 105.

A crane operator operates the crane 100 by operating an operation device on an operation desk 1 provided inside the operation room 111. The crane operator first drives the running wheels 102 to travel the frame 101 to a target position, and stops the frame 101. During the travel of the frame 101, the container-grabber 105 is hoisted up at a normal upper limit position in a state in which the container-grabber 105 grabs no container 108R. During the travel of the frame 101, the movable body 103 is at an arbitrary position relative to the frame 101. After the stoppage of the frame 101, the crane operator makes the container-grabber 105 grab a container 108 that has been carried in by the truck 107, and drives the wind-up drums 112 to hoist the container 108 up and then makes the container 108 traverse together with the movable body 103. Then, the crane operator stops the movable body 103 at a target position and pays the wire ropes 104 out to lower the container 108R together with the container-grabber 105 and puts down the container 108R. In such a manner as described above, the crane operator performs the work for stacking a container 108 that has been carried in by the truck 107 at a designated position. On the other hand, if an instruction to carry a container 108 out of the container yard is provided, the crane operator performs the work for hoisting up and carrying a designated one from among the held containers 108 and loading the container 108 on a vacant truck 107.

The scanning-type distance meter 109 is, for example, one that measures a distance between a target object and the scanning-type distance meter 109 by irradiating the target object with electromagnetic wave for measurement such as laser light or microwave and detecting, e.g., a phase difference between the electromagnetic wave and the reflected wave thereof. In addition, the scanning-type distance meter 109 can output an irradiation angle of the electromagnetic wave for measurement and a distance measurement value corresponding to the angle for each measurement point by successively performing measurement while rotating an irradiation direction of the electromagnetic wave for measurement. As illustrated in FIG. 2, the scanning-type distance meter 109 can measure a distance and an angle between the scanning-type distance meter 109 and each of objects (for example, placed containers 108Q, the bed 110 of the truck 107, and the ground) under a range of movement of the movable body 103 by scanning a vertical plane parallel to the traverse direction with the irradiation directions of the electromagnetic wave.

Figure 3:
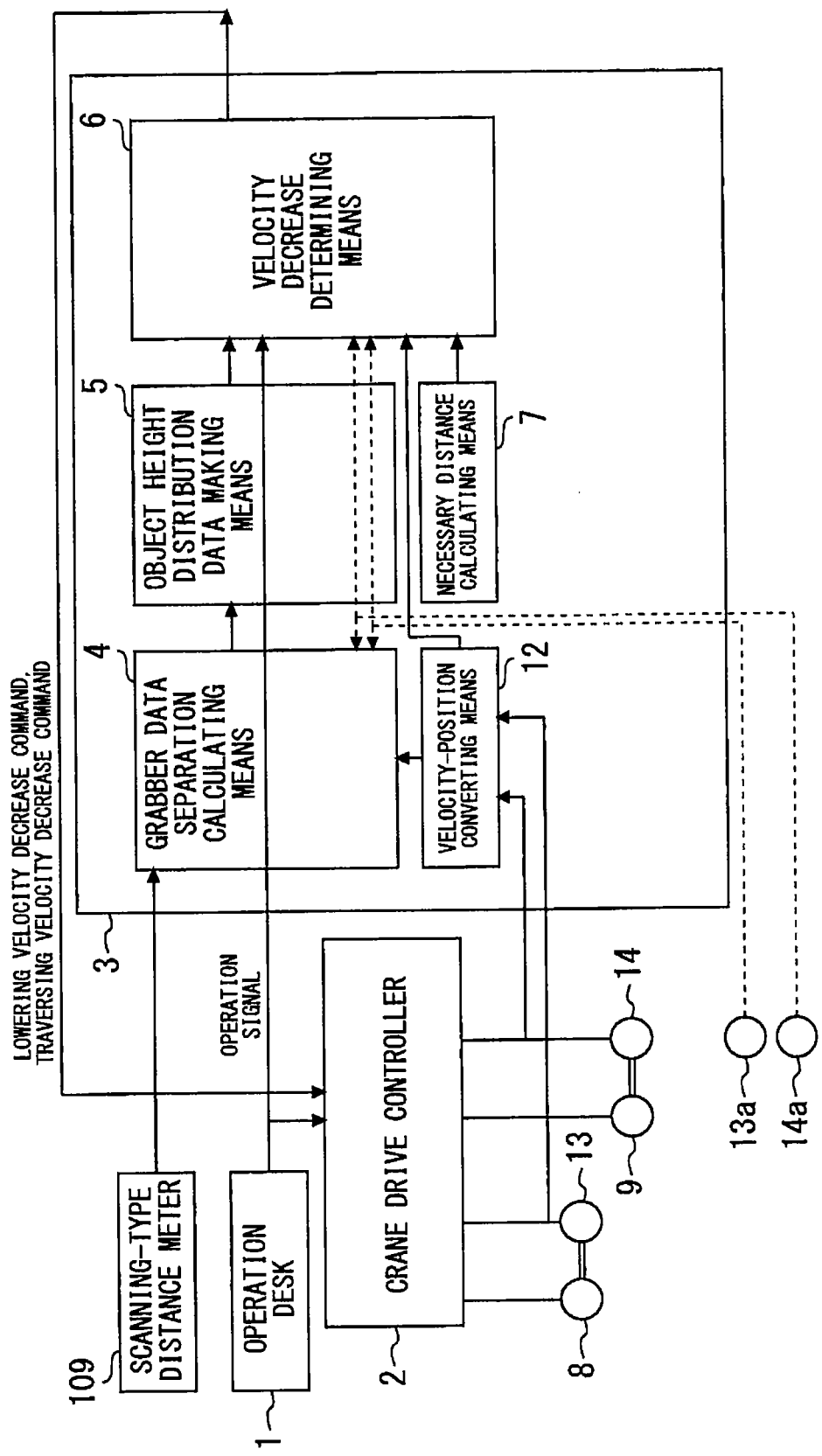
FIG. 3 is a block diagram illustrating a crane control system to which the crane operation assistance system according to Embodiment 1 of the present invention has been applied.

FIG. 3 is a block diagram illustrating a crane control system to which the crane operation assistance system according to Embodiment 1 of the present invention has been applied. As illustrated in FIG. 3, the crane 100 in the present embodiment includes the operation desk 1 provided with the operation device that a crane operator operates, a crane drive controller 2, an operation assistance controller 3, a hoisting motor 8 that drives the wind-up drums 112, a lifting/lowering velocity detector 13 that detects a lifting/lowering velocity of the container-grabber 105, a traverse motor 9 that makes the movable body 103 traverse, and a traversing velocity detector 14 that detects a traversing velocity of the movable body 103. In FIG. 3, illustration of auxiliary machinery that is not related to the description of the present invention is omitted.

The crane drive controller 2 includes a main controller that generates an auxiliary machinery command signal and a velocity reference signal from an operation signal and an auxiliary machinery signal, and a power converter that drives the hoisting motor 8 and the traverse movement motor 9.

The operation assistance controller 3 includes grabber data separation calculating means 4, object height distribution data making means 5, velocity decrease determining means 6, necessary distance calculating means 7 and velocity-position converting means 12. The velocity-position converting means 12 calculates a height position of the container-grabber 105 based on the lifting/lowering velocity detected by the lifting/lowering velocity detector 13. Also, the velocity-position converting means 12 calculates a position of the movable body 103 based on the traversing velocity of the movable body 103 detected by the traversing velocity detector 14. Instead of the velocity-position converting means 12, a height position detector 13a that detects the height position of the container-grabber 105, and a movable body position detector 14a that detects the position of the movable body 103 may be provided.

The scanning-type distance meter 109 transmits measurement information including angles and distance measurement values corresponding to the angles, to the operation assistance controller 3. An example of the measurement information provided by the scanning-type distance meter 109 is schematically indicated by the bold lines in FIG. 2. The grabber data separation calculating means 4 in the operation assistance controller 3 recognizes a portion corresponding to the container-grabber 105 and a hung container 108R from the measurement information transmitted from the scanning-type distance meter 109 and separates the portion from the measurement information. Based on the measurement information with the portion corresponding to the container-grabber 105 and the hung container 108R excluded, the object height distribution data making means 5 makes object height distribution data, which is data indicating a distribution of heights of objects under the range of movement of the movable body 103, for example, the containers 108Q, the bed 110 and the ground. The object height distribution data making means 5 makes the object height distribution data by, for example, connecting respective points measured by the scanning-type distance meter 109 via lines. The scanning-type distance meter 109 successively performs measurement also when the movable body 103 is moving. The object height distribution data making means 5 makes object height distribution data in accordance with the position of the movable body 103.

In the present embodiment, the velocity decrease determining means 6 and the necessary distance calculating means 7 provide automatic velocity decreasing means. When the container 108R hung from the movable body 103 is lowering, the velocity decrease determining means 6 issues a lowering velocity decrease command to the crane drive controller 2 based on the object height distribution data and a value of a distance necessary for a velocity decrease, which is calculated by the necessary distance calculating means 7, so that the lowering velocity of the container 108R is automatically decreased before the container 108R collides with an object located vertically below the container 108R, for example, the containers 108Q, the bed 110 or the ground. Also, when the container-grabber 105 grabbing no container 108 is lowering, the velocity decrease determining means 6 issues a lowering velocity decrease command to the crane drive controller 2 based on the object height distribution data and a value of a distance necessary for a velocity decrease, which is calculated by the necessary distance calculating means 7, so that the lowering velocity of the container-grabber 105 is automatically decreased before the container-grabber 105 collides with an object located vertically below the container-grabber 105.

Also, when the container 108R hung from the movable body 103 is traversing together with the movable body 103, the velocity decrease determining means 6 issues a traversing velocity decrease command to the crane drive controller 2 based on the object height distribution data and a value of a distance necessary for a velocity decrease, which is calculated by necessary distance calculating means 7, so that the traversing velocity of the movable body 103 is automatically decreased before the movable body 103 collides with an object located ahead in a direction of the movement of the container 108R, for example, a container 108Q. Also, when the container-grabber 105 grabbing no container 108 is traversing together with the movable body 103, the velocity decrease determining means 6 issues a traversing velocity decrease command to the crane drive controller 2 based on the object height distribution data and a value of a distance necessary for a velocity decrease, which is calculated by the necessary distance calculating means 7, so that the traversing velocity of the container-grabber 105 is automatically decreased before the container-grabber 105 collides with an object located ahead in a direction of the movement of the container-grabber 105.

Since the present embodiment enables automatic velocity decrease as descried above, even if a crane operator makes a mistake in eye measurement or is late in velocity decrease operation, a container 108R or the container-grabber 105 that is lowering or traversing while being hung from the movable body 103 can reliably be prevented from colliding with an object at a high velocity. Consequently, e.g., the containers 108R and 108Q and the contents thereof, the bed 110 of the truck 107 and a driver of the truck 107 can reliably be prevented from being damaged, and can reliably be protected. In particular, an accident such as a container 108R that is traversing while being hung from the movable body 103 colliding with highly-stacked containers 108Q at a high velocity and the highly-stacked containers 108Q falling can reliably be prevented, enabling achievement of high safety.

FIG. 4 is a diagram for describing automatic velocity decrease and object height distribution data revision, which will be described later. As illustrated in FIG. 4, in the present embodiment, object height distribution data is represented using coordinates by position X in the traverse direction and height position H. In addition, it is assumed that Vt is a current velocity, VL is a creep velocity, which is a velocity after completion of a velocity decrease, YL is a movement distance from a start of the velocity decrease to the completion of the velocity decrease, T is time required from the current velocity Vt until stoppage, TL is velocity decrease time required from the current velocity Vt to the creep velocity VL and A is a deceleration. The creep velocity VL is a velocity that is low enough to cause no damage even if a container 108R or the container-grabber 105 lands on or hits, e.g., any of the containers 108Q, the bed 110 or the ground. The distance YL necessary for a velocity decrease can be obtained according to the following expressions. The following expressions are common to both lowering and traversing. Also, here, for simplicity of description, it is assumed that the deceleration A is constant; however, in actual control, arrangement may be made so that the deceleration A gradually changes at the times of a start and an end of velocity decrease.

$$TL = T \cdot (Vt - VL)/Vt \quad (1)$$

$$YL = (Vt - VL) \cdot TL + A \cdot TL/2 \quad (2)$$

The necessary distance calculating means 7 calculates a distance YL necessary for a velocity decrease based on Expressions (1) and (2) above and provides the distance YL to the velocity decrease determining means 6. It is assumed that Hp is a height of an object located vertically below the container 108R or the container-grabber 105, Hs is a height of a lower surface of the container-grabber 105, Ch is a height dimension of the hung container 108R and Yh is a margin distance. When an automatic velocity decrease for lowering is made, the velocity decrease determining means 6 issues a lowering velocity decrease command to the crane drive controller 2 based on the object height distribution data at a point of time of the following expression being satisfied:

$$D - YL - Yh \leq Hp \quad (3).$$

If the container-grabber 105 grabs the container 108R, D in Expression (3) above is calculated according to the following expression:

$$D = Hs - Ch \quad (4).$$

If the container-grabber 105 grabs no container 108R, D in Expression (3) above is obtained according to the following expression:

$$D = Hs \quad (5).$$

According to the above-described control, a velocity decrease is completed when the lower surface of the container 108R or the container-grabber 105 that is lowering is at a position that is the margin distance Yh above the height Hp of the object located vertically below the container 108R or the container-grabber 105, and the lowering velocity becomes equal to the creep velocity VL. Thus, the velocity decrease can reliably be completed before the lower surface of the container 108R or the container-grabber 105 collides with the object.

Also, when the movable body 103 is traversing, the necessary distance calculating means 7 performs calculations that are similar to those of Expressions (1) and (2) above to calculate a distance XL necessary for a velocity decrease, and provides the distance XL to the velocity decrease determining means 6. Here, it is assumed that Xa is a position of a side surface on the right side in FIG. 4 of the container 108R or the container-grabber 105, Xb is a position of a side surface on the left side in FIG. 4 of the container 108R or the container-grabber 105 and Xh is a margin distance. The velocity decrease determining means 6 obtains a position Xp that is ahead in the direction of movement of the movable body 103 at which an object height H is equal to or exceeds the height D of the lower surface of the container 108R or the container-grabber 105, based on the object height distribution data. If the movable body 103 is traversing rightward in FIG. 4, the velocity decrease determining means 6 issues a traversing velocity decrease command to the crane drive controller 2 at a point of time of the following expression being satisfied.

$$Xa + XL + Xh \geq Xp \quad (6)$$

Also, if the movable body 103 is traversing leftward in FIG. 4, the velocity decrease determining means 6 issues a traversing velocity decrease command to the crane drive controller 2 at a point of time of the following expression being satisfied.

$$Xb - XL - Xh \leq Xp \quad (7)$$

As a result of the control described above, a velocity decrease is completed when a side surface of the container 108R or the container-grabber 105 that is traversing is at a position that is the margin distance Xh back from a position Xp of an object the container 108R or the container-grabber 105 possibly collides with, and the traversing velocity becomes equal to the creep velocity VL. Thus, the velocity decrease can reliably be completed before the side surface of the container 108R or the container-grabber 105 collides with the object.

If a crane operator performs an operation to change the movement direction to a direction that is opposite to the movement direction during movement at the creep velocity VL, there is no possibility of collision, and thus the crane drive controller 2 preferably performs control to cancel the velocity decreased state and provide a normal movement velocity.

Figure 5:
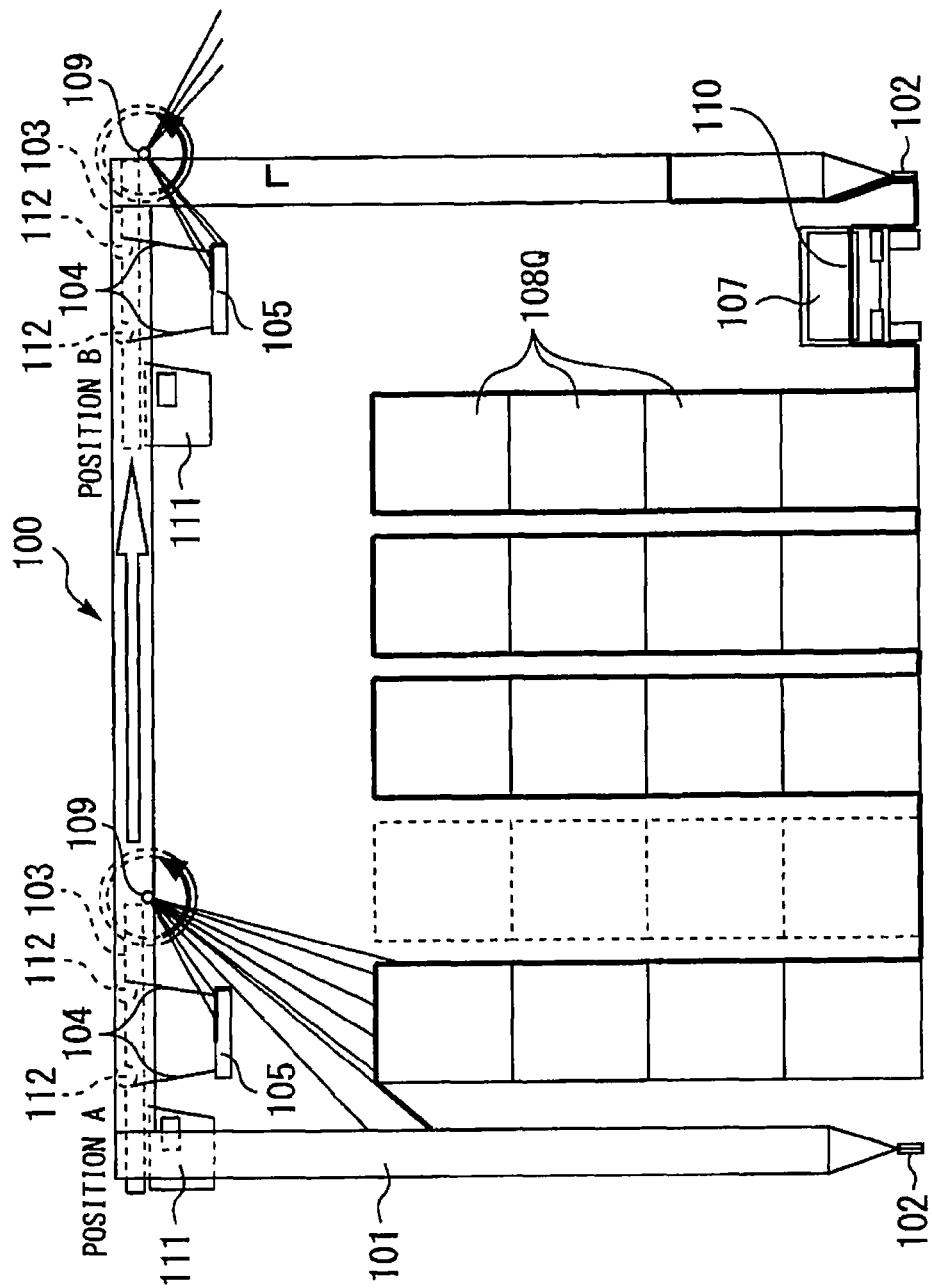
FIG. 5 is a front view of the crane illustrated in FIG. 1.

FIG. 5 is a front view of the crane 100 illustrated in FIG. 1. FIG. 5 illustrates a case where the movable body 103 traverses from position A to position B. Position A is a home position of the movable body 103, that is, a position at which a crane operator gets in the operation room 111. Also, position A is a position at which the container-grabber 105 is located vertically above a container storage space in a leftmost row in FIG. 5. Position B is a position at which the container-grabber 105 is located vertically above the running lane for the truck 107. In other words, position B is a position when a container 108 is loaded on the truck 107 or a container 108 is hoisted up from the truck 107. Object height distribution data made based on information measured by the scanning-type distance meter 109 during the traversing of the movable body 103 from position A to position B is schematically indicated by the bold lines in FIG. 5. In the case illustrated in FIG. 5, there are no blind spots for the scanning-type distance meter 109, and thus a distribution of heights of objects can properly be detected.

Figure 6:
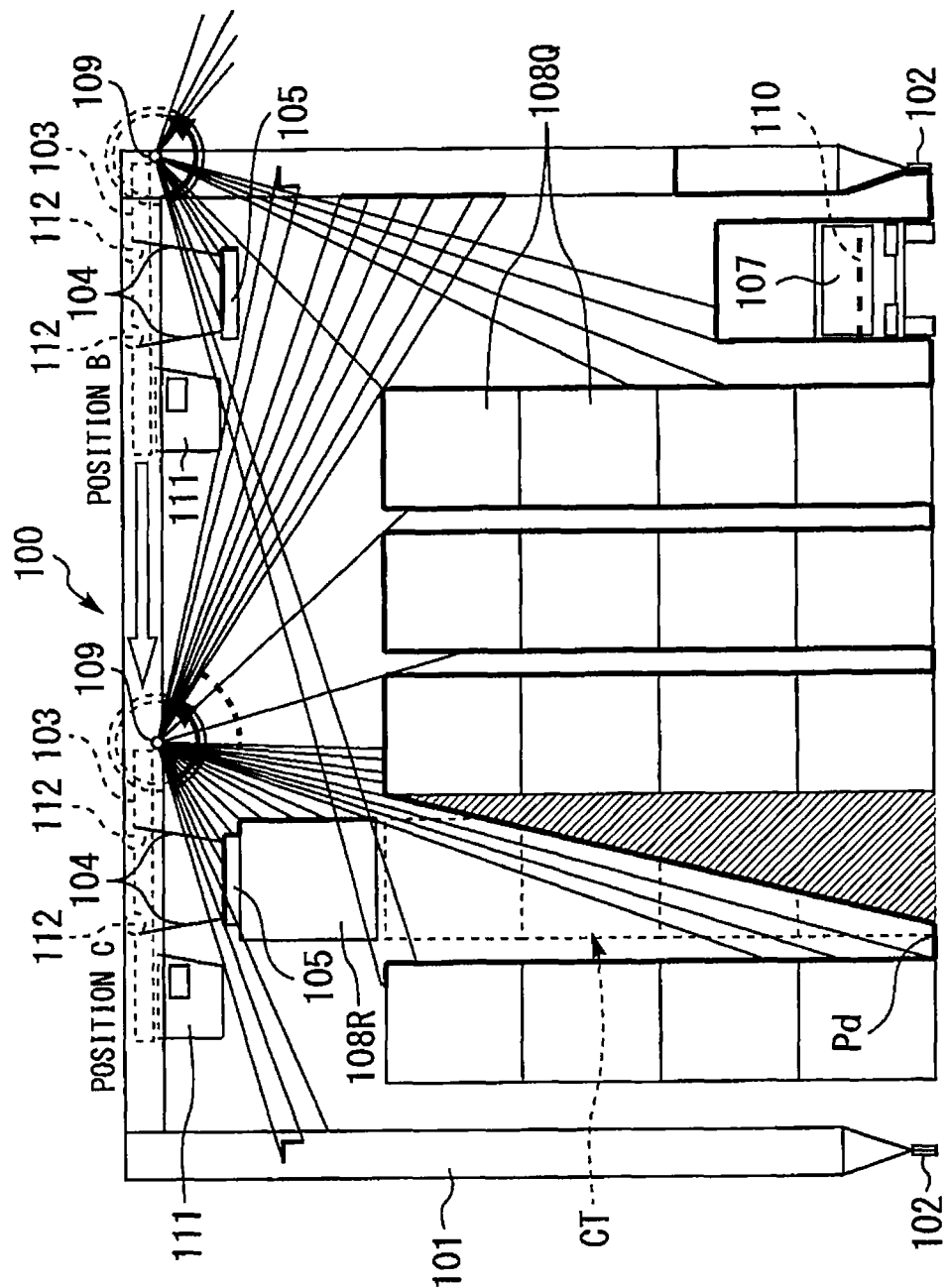
FIG. 6 is a front view of the crane illustrated in FIG. 1.

FIG. 6 is a front view of the crane 100 illustrated in FIG. 1. FIG. 6 illustrates a case where the running wheels 102 are driven to move the frame 101 to a target position with the movable body 103 located at position B, and then the movable body 103 hoists up a container 108R carried in by the truck 107, traverses from position B to position C, and lowers the container 108R. Position C is a position at which the container-grabber 105 is located vertically above a container storage space in a second row from the left side in FIG. 6. Object height distribution data made based on information measured by the scanning-type distance meter 109 during the traversing of the movable body 103 from position B to position C is schematically indicated by the bold lines in FIG. 6. In the case illustrated in FIG. 6, the hatched triangle zone in FIG. 6 is a blind spot for the scanning-type distance meter 109. Such zone of the blind spot occurs because the scanning-type distance meter 109 does not reach the position that is vertically above the position at which the container 108R is lowered.

If a blind spot for the scanning-type distance meter 109 has occurred as described above, a slant face of the aforementioned triangle is recognized as an object height, and thus, if an automatic velocity decrease for lowering or traversing is made, control is performed so as to complete the velocity decrease before a collision with the slant face of the triangle. However, containers 108 have a width that is standardized by the ISO (International Organization for Standardization) and thus fixed, and thus, in reality, no container 108 is present in the aforementioned triangle zone. Therefore, for the zone of the blind spot, an automatic velocity decrease is started at a position that is unnecessarily back. As a result, time necessary for lowering or traversing of the container 108R or the container-grabber 105 increases, resulting in decrease in operation efficiency.

In order to improve such point, in the present embodiment, if a blind spot for the scanning-type distance meter 109 has occurred in object height distribution data, data of object heights in the zone of the blind spot is revised as described below. The object height distribution data making means 5 revises the date of object heights in the zone of the blind spot based on data of an object height at a point that is farthest from the scanning-type distance meter 109 in a imaginary containers presence zone having an overlap with the zone of the blind spot. In FIG. 6, the zone of the blind spot has occurred in the container storage space in the second row from the left side, and thus, the area indicated by thin dashed lines is the imaginary containers presence zone CT having the overlap with the zone of the blind spot. Therefore, in the case in FIG. 6, data of the object height at the point that is farthest from the scanning-type distance meter 109 in the imaginary containers presence zone CT having the overlap with the zone of the blind spot is a height at a point Pd. If the blind spot has occurred in the made object height distribution data, the object height distribution data making means 5 revises the data of object heights in the zone of the blind spot uniformly to a value equal to the object height at the farthest point Pd.

A further description of revision of object height distribution data will be provided with reference to FIG. 4. A bold dashed line S in the upper graph in FIG. 4 is a line indicating data of object heights in a zone of a blind spot before revision. If the blind spot has occurred, the object height distribution data making means 5 revises the data of the object heights in the zone of the blind spot to lines Hn and Xn from the line S. The lower graph in FIG. 4 indicates the revised object height distribution data. In the revised object height distribution data, the data of the object heights in the zone of the blind spot has been revised so as to be equal to the object height at the farthest point Pd. The object height distribution data making means 5 stores the object height distribution data revised as described above in a memory. The velocity decrease determining means 6 determines a position for a start of a velocity decrease based on the stored, revised object distribution data, and issues a velocity decrease command to the crane drive controller 2. In the revised object height distribution data, the triangle zone, which is a zone of the blind spot, has been removed. Thus, an automatic velocity decrease is performed based on the revised object height distribution data, enabling avoiding the automatic velocity decrease to be started at a position that is unnecessary back. Thus, the operation efficiency can be enhanced. On the left side of each of the graphs in FIG. 4, there is an area for which no distance measurement has been performed; however, this area is sequentially detected when the position of the movable body 103 traverses to the left and thus there is no risk of collision with an object.

In the present embodiment, as illustrated in FIG. 6, if the movable body 103 traverses leftward in FIG. 6, a blind spot for the scanning-type distance meter 109 may occur. Thus, arrangement may be made so that a direction of the traversing of the movable body 103 is determined and if the movable body 103 traverses leftward in FIG. 6, object height distribution data is revised. Also, arrangement may be made so that whether or not the position of the container-grabber 105 is located vertically above an area of the container yard in which containers 108Q are to be placed and if it is determined that the position of the container-grabber 105 is located vertically above an area of the container yard in which containers 108Q are to be placed, object height distribution data is revised.

Figure 7:
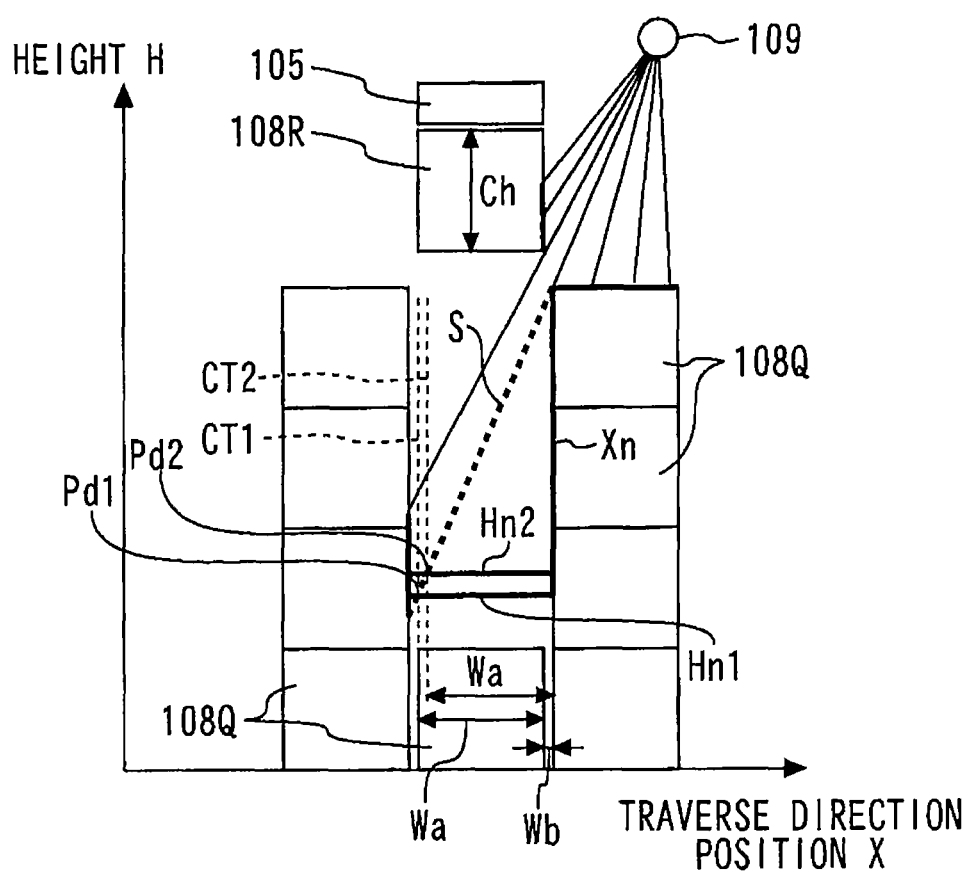
FIG. 7 is a diagram for describing revision of object height distribution data.

FIG. 7 is a diagram for describing revision of object height distribution data. A further description of revision of object height distribution data by the object height distribution data making means 5 will be provided below with reference to FIG. 7. As illustrated in FIG. 7, a position a distance corresponding to a sum of a width Wa of container 108 and a width Wb of an interspace between the containers away from a position of side surfaces of containers 108Q in a row next to a container storage space in which a blind spot for the scanning-type distance meter 109 has occurred may be set as a boundary of a imaginary containers presence zone CT1. Alternatively, for providing a margin on the safer side, a position the width Wa of the container 108 away from a position of the side surfaces of the containers 108Q in the next row may be set as a boundary of a imaginary containers presence zone CT2. Where the imaginary containers presence zone CT1 is set, data of an object height at a point that is farthest from the scanning-type distance meter 109 in the imaginary containers presence zone CT1 is a height at a point Pd1. Thus, where the imaginary containers presence zone CT1 is set, the data of the object heights in the zone of the blind spot is revised to a line Hn1, which is a line of heights equal to the object height at the point Pd1, from a line S before revision. Where the imaginary containers presence zone CT2 is set, data of an object height at a point that is farthest from the scanning-type distance meter 109 in the imaginary containers presence zone CT2 is a height at a point Pd2. Thus, where the imaginary containers presence zone CT2 is set, the data of the object heights in the zone of the blind spot is revised to a line Hn2, which is a line of heights equal to the object height at the point Pd2, from the line S before revision.

In the example illustrated in FIG. 7, a container 108Q is placed in one tier in the zone of the blind spot for the scanning-type distance meter 109. Then, the scanning-type distance meter 109 cannot measure an upper surface of the container 108Q in the zone of the blind spot at all. According to the present embodiment, even if the scanning-type distance meter 109 cannot measure an upper surface of a container 108Q in a zone of a blind spot at all like the example illustrated in FIG. 7, object height distribution data in the zone of the blind spot can be revised. Thus, a start of an automatic velocity decrease from a position that is unnecessarily back is suppressed to a maximum possible extent, enabling enhancement in operation efficiency.

In the above description, when revising data of object heights in a zone of a blind spot, the data of object heights in the zone of the blind spot is revised uniformly to a value equal to an object height at a point that is farthest from the scanning-type distance meter 109 in a imaginary containers presence zone having an overlap with the zone of the blind spot. Alternatively, for providing a margin on the safer side, the data of object heights in the zone of the blind spot is revised uniformly to a value that is somewhat higher than the object height at the farthest point.

In the present embodiment, only one scanning-type distance meter 109 is mounted on the movable body 103. As described above, according to the present embodiment, even if a blind spot for the scanning-type distance meter 109 has occurred, object height distribution data in the zone of the blind spot can properly be revised. Thus, there is no need to provide a plurality of scanning-type distance meters 109 to prevent occurrence of a blind spot for the scanning-type distance meter 109, enabling reduction in costs. However, in the present invention, a plurality of scanning-type distance meters 109 may be mounted on the movable body 103.

In the present embodiment, control for an automatic velocity decrease is performed based on object height distribution data; however, in the present invention, control for an automatic velocity decrease does not necessarily need to be performed, and for example, object height distribution data may be imaged and presented to a crane operator to assist operation. In such case, if a blind spot for the scanning-type distance meter 109 has occurred and object height distribution data is revised, both of object height distribution data before and after the revision may be presented to a crane operator.

Embodiment 2

Figure 8:
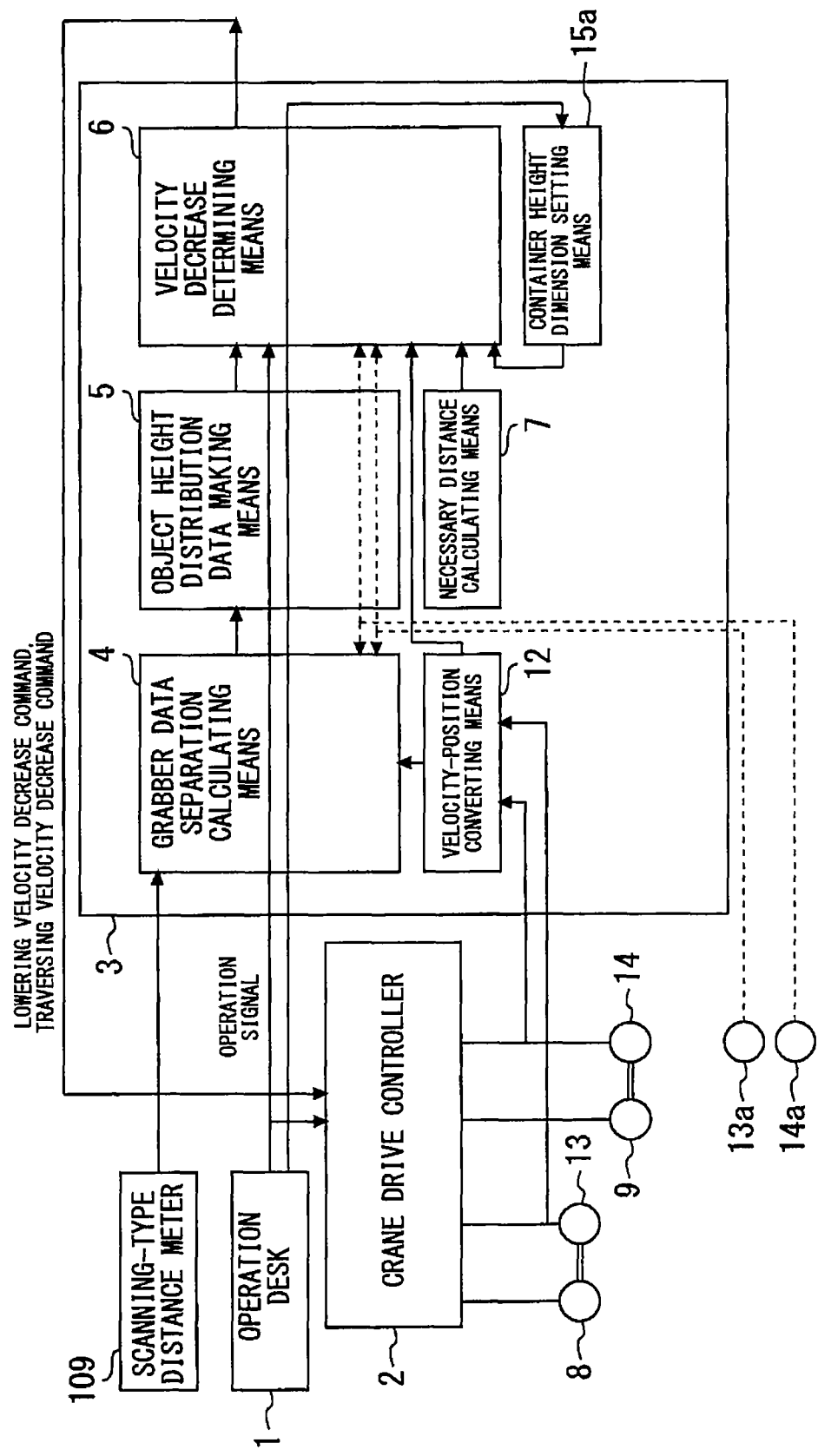
FIG. 8 is a block diagram illustrating a crane control system to which a crane operation assistance system according to Embodiment 2 of the present invention has been applied.

Next, Embodiment 2 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 8 is a block diagram illustrating a crane control system to which a crane operation assistance system according to Embodiment 2 of the present invention has been applied. As illustrated in FIG. 8, an operation assistance controller 3 in Embodiment 2 further includes container height dimension setting means 15a in addition to the same configuration as Embodiment 1.

In a container yard, plural types of containers 108 having different height dimensions Ch may be mixedly collected. In Embodiment 2, in such case, a value of one having a largest height dimension from among the plural types of containers 108 can be set by the container height dimension setting means 15a. A maximum value of a container height dimension set by the container height dimension setting means 15a can be set by, for example, a crane operator via an operation desk 1. Where velocity decrease determining means 6 performs a calculation according to Expression (4) described in Embodiment 1, the velocity decrease determining means 6 uses the maximum value of the container height dimension set by the container height dimension setting means 15a as Ch to calculate a position of a lower surface of a container 108R hung from the movable body 103. According to Embodiment 2, as a result of the above control being performed, start positions for automatic velocity decreases for lowering and traversing are determined with the container 108R hung from the movable body 103 regarded as having a largest height dimension. Thus, regardless of the type of container 108R the movable body 103 hoists, an automatic velocity decrease for lowering and traversing can safely be made.

Embodiment 3

Figure 9:
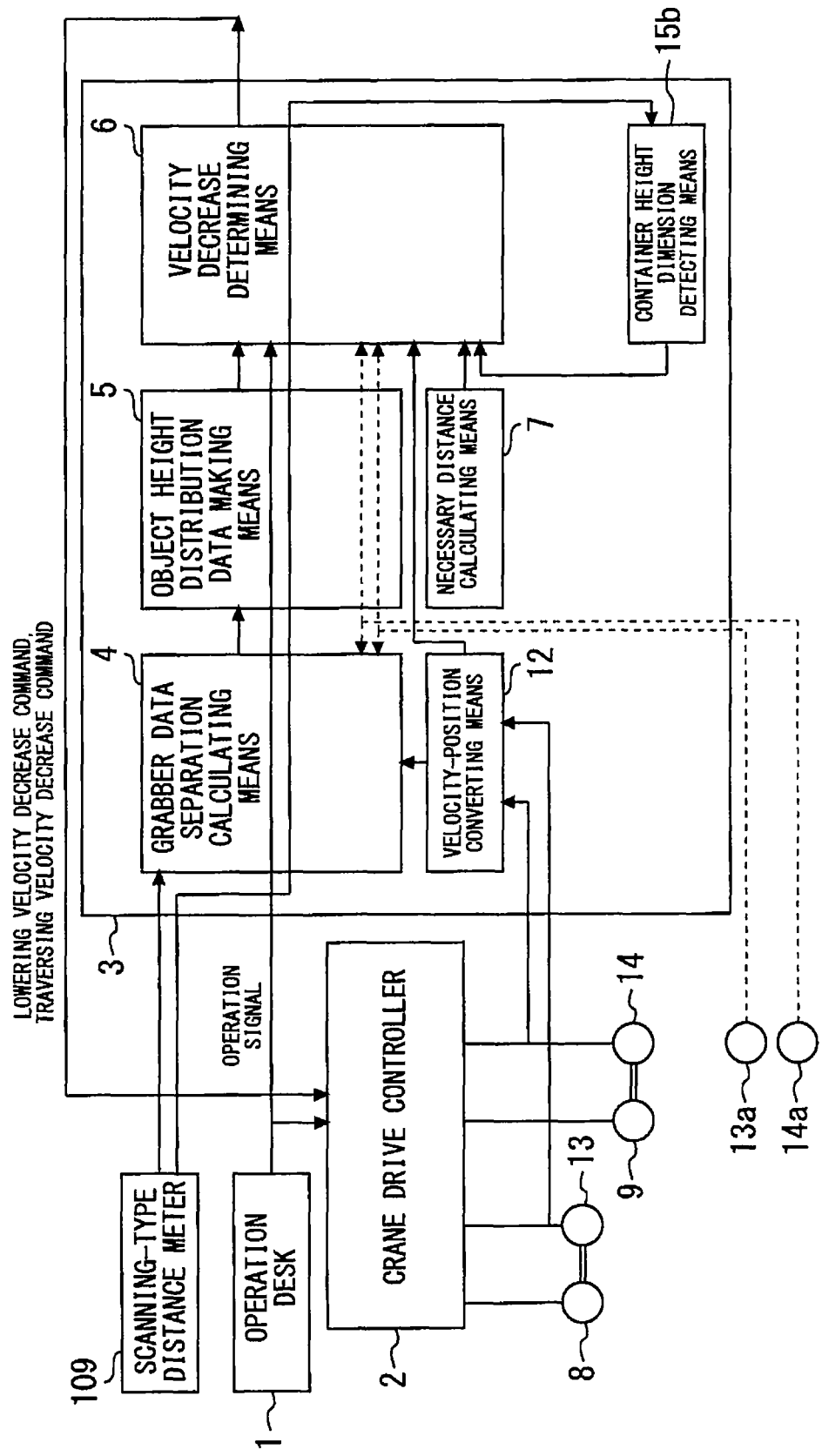
FIG. 9 is a block diagram illustrating a crane control system to which a crane operation assistance system according to Embodiment 3 of the present invention has been applied.

Next, Embodiment 3 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 9 is a block diagram illustrating a crane control system to which a crane operation assistance system according to Embodiment 3 of the present invention has been applied. As illustrated in FIG. 9, an operation assistance controller 3 in Embodiment 3 further includes container height dimension detecting means 15b in addition to the same configuration as Embodiment 1.

Figure 10:
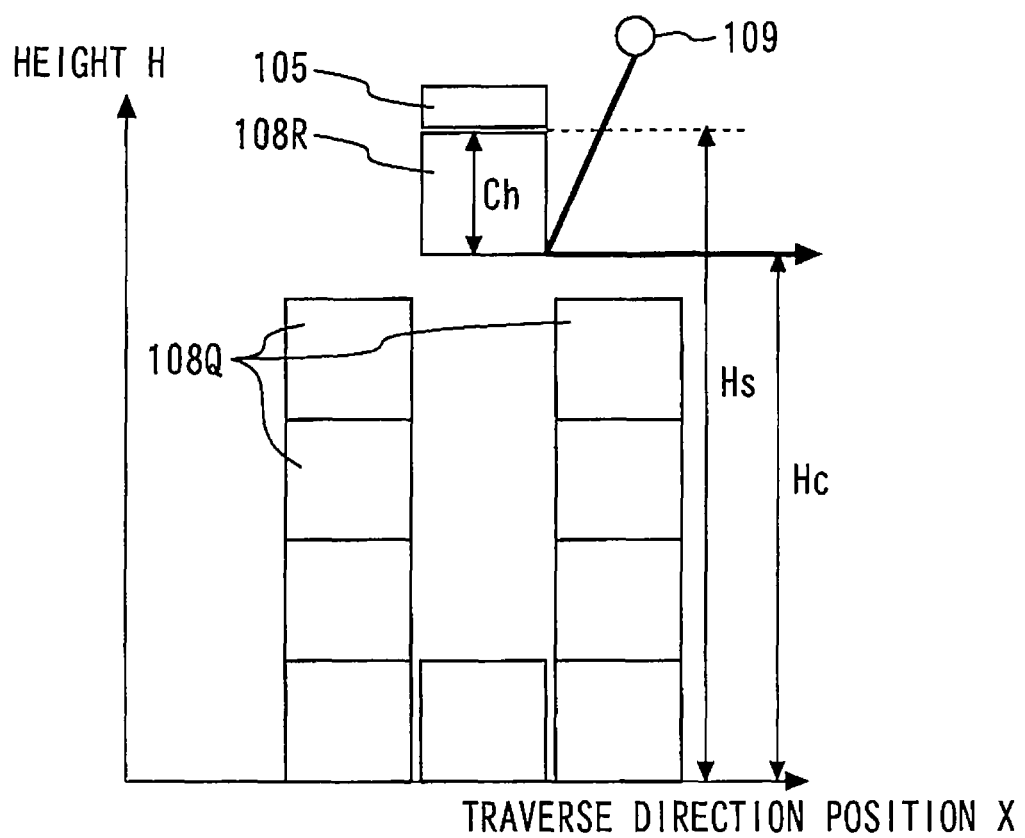
FIG. 10 is a diagram for describing a method of detecting a height dimension of a container in Embodiment 3.

The container height dimension detecting means 15b detects a height dimension Ch of a container 108R hung from a movable body 103, based on information obtained as a result of measurement of a position of a lower end of the container 108R using a scanning-type distance meter 109. FIG. 10 is a diagram for describing a method of detecting a height dimension Ch of a container 108R in Embodiment 3. As illustrated in FIG. 10, the container height dimension detecting means 15b calculates a height He of a lower end of a container 108R hung from the movable body 103 based on information obtained as a result of measurement of a position of the lower end of the container 108R using the scanning-type distance meter 109, and based on the value of the height Hc and a height Hs of a lower surface of a container-grabber 105, which is known, calculates a height dimension Ch of the container 108R according to the following expression:

$$Hs-Hc=Ch \qquad (8).$$

Where the velocity decrease determining means 6 performs a calculation according to Expression (4) described in Embodiment 1, the velocity decrease determining means 6 uses the container height dimension Ch detected by the container height dimension detecting means 15b to calculate a position of a lower surface of the container 108R hung from the movable body 103. According to Embodiment 3, as a result of such control being performed, start positions for automatic velocity decrease for lowering and traversing can be determined by automatically detecting a height dimension Ch of a container 108R hung from the movable body 103 and calculating a position of a lower surface of the container 108R. Consequently, regardless of the height dimension a container 108R hung from the movable body 103 has, a start position for an automatic velocity decrease can be optimized, enabling achievement of high safety and further enhancement in operation efficiency.

Embodiment 4

Figure 11:
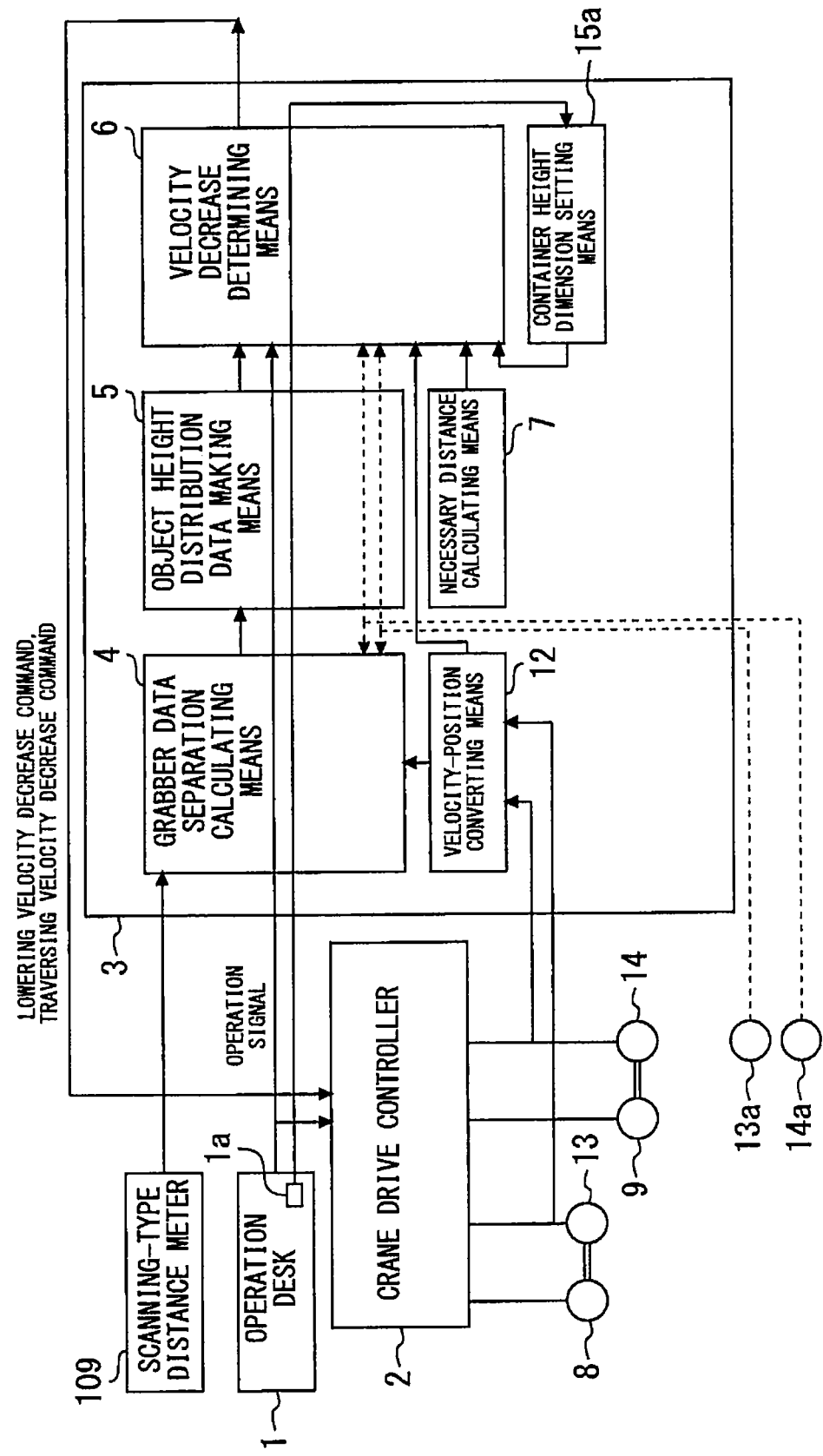
FIG. 11 is a block diagram illustrating a crane control system to which a crane operation assistance system according to Embodiment 4 of the present invention has been applied.

Next, Embodiment 4 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 11 is a block diagram illustrating a crane control system to which a crane operation assistance system according to Embodiment 4 of the present invention has been applied. As illustrated in FIG. 11, an operation assistance controller 3 in Embodiment 4 further includes container height dimension setting means 15a in addition to the same configuration as Embodiment 1. Also, in an operation desk 1, a selection switch 1a, which serves as selection means for allowing a crane operator to select information on a height dimension Ch of a container 108, is provided.

In Embodiment 4, a crane operator operates the selection switch 1a to select information on a height dimension Ch of a container 108R according to a type of a container 108R to be hoisted by a movable body 103. The container height dimension setting means 15a receives a signal from the selection switch 1a and sets a height dimension Ch of a container 108R selected by the crane operator. Where velocity decrease determining means 6 performs a calculation according to Expression (4) described in Embodiment 1, the velocity decrease determining means 6 uses the container height dimension Ch set by the container height dimension setting means 15a, to calculates a position of a lower surface of the container 108R hung from the movable body 103. According to Embodiment 4, as a result of such control being performed, start positions for automatic velocity decrease for lowering and traversing can be determined by receiving information on a height dimension Ch of a container 108R hung from the movable body 103 from a crane operator and calculating a position of a lower surface of the container 108R based on the information. Consequently, regardless of the type of container 108R the movable body 103 hoists, a start position for an automatic velocity decrease can be optimized, enabling achievement of high safety and further enhancement in operation efficiency.

Embodiment 5

Figure 12:
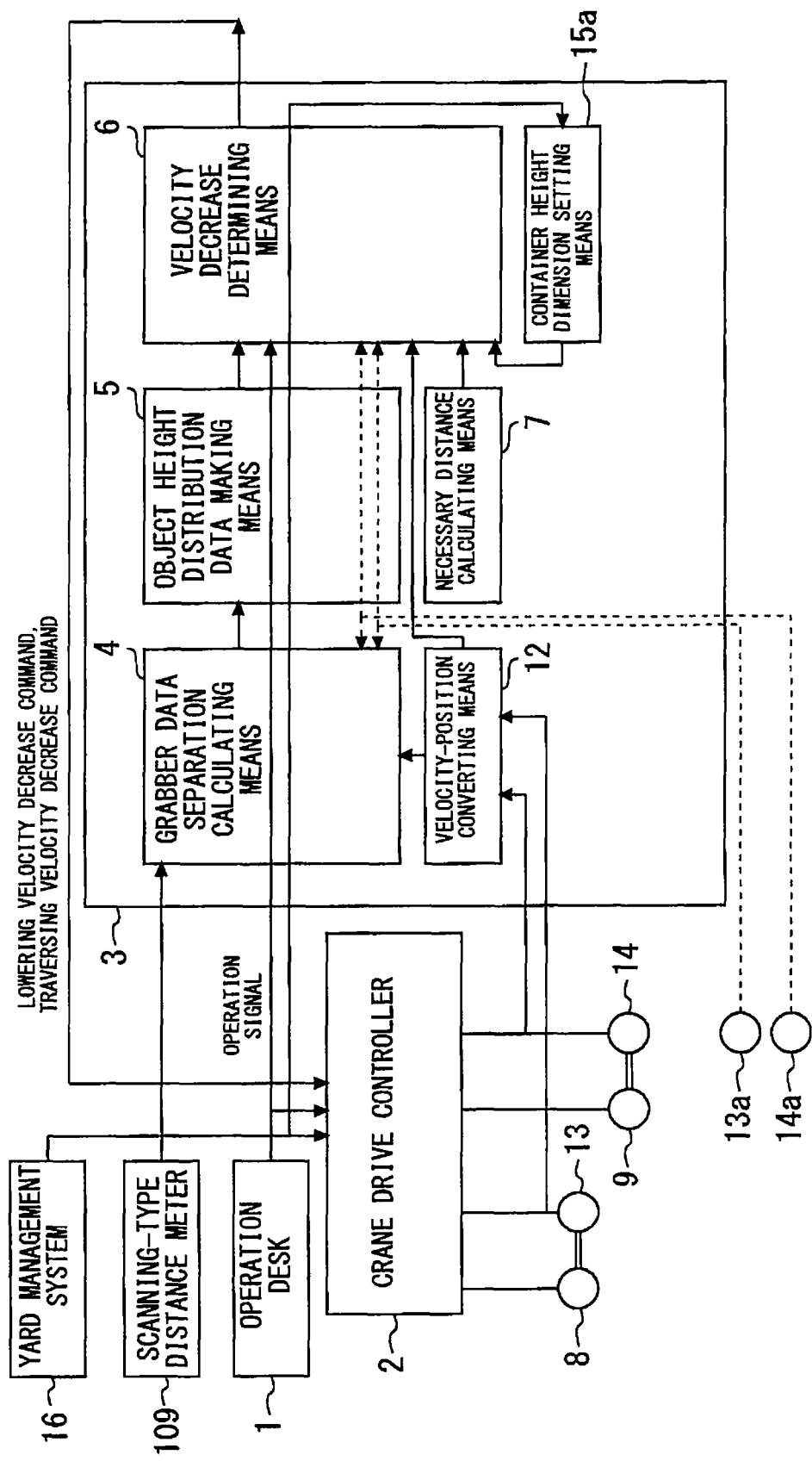
FIG. 12 is a block diagram illustrating a crane control system to which a crane operation assistance system according to Embodiment 5 of the present invention has been applied.

Next, Embodiment 5 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 12 is a block diagram illustrating a crane control system to which a crane operation assistance system according to Embodiment 5 of the present invention has been applied. As illustrated in FIG. 12, an operation assistance controller 3 in Embodiment 5 further includes container height dimension setting means 15a in addition to the same configuration as Embodiment 1.

The crane control system in Embodiment 5 can receive a container transport instruction information sent from a yard management system 16, which is an upper system, via a transmitter. The yard management system 16 is a system that manages operations in the entire container yard, and makes plans and provides instructions in relation to, e.g., carrying-in and out, an arrangement and storage of containers 108, and loading/unloading of the containers 108 to/from container ships. In Embodiment 5, information on a height dimension Ch of containers 108 is included in the container transport instruction information sent from the yard management system 16. The container height dimension setting means 15a sets a height dimension Ch of the containers 108 based on the container transport instruction information transmitted from the yard management system 16. Where velocity decrease determining means 6 performs a calculation according to Expression (4) described in Embodiment 1, the velocity decrease determining means 6 uses the container height dimension Ch set by the container height dimension setting means 15a, to calculate a position of a lower surface of a container 108R hung from a movable body 103. According to Embodiment 5, as a result of such control being performed, start positions for automatic velocity decreases for lowering and traversing can be determined by receiving information on a height dimension Ch of a container 108R hung from the movable body 103 from the yard management system 16 and calculating a position of a lower surface of the container 108R based on the information. Consequently, regardless of the type of container 108R the movable body 103 hoists, a start position for an automatic velocity decrease can be optimized, enabling achievement of high safety and further enhancement in operation efficiency.

Embodiment 6

Figure 13:
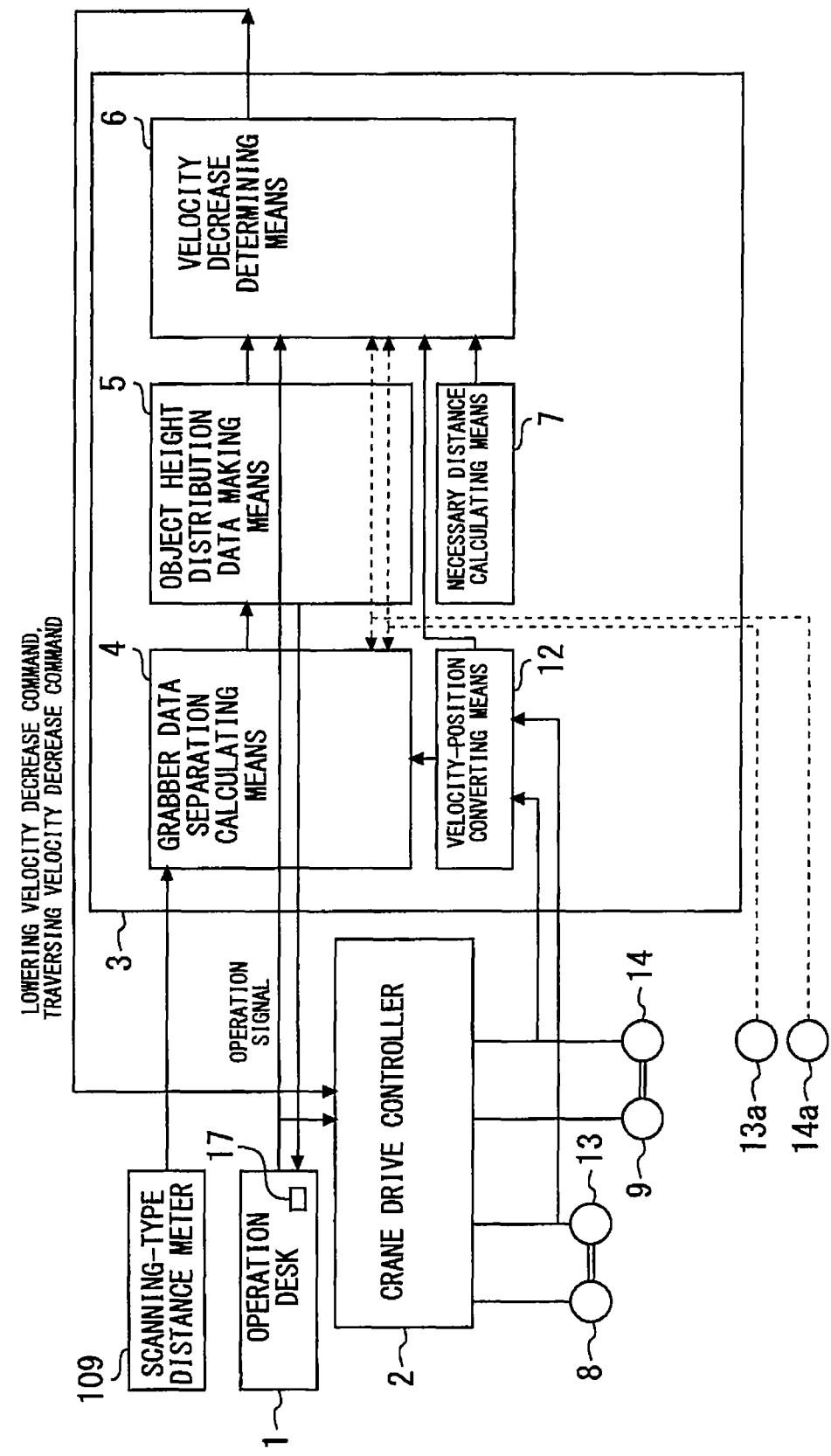
FIG. 13 is a block diagram illustrating a crane control system to which a crane operation assistance system according to Embodiment 6 of the present invention has been applied.

Next, Embodiment 6 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 13 is a block diagram illustrating a crane control system to which a crane operation assistance system according to Embodiment 6 of the present invention has been applied. As illustrated in FIG. 13, Embodiment 6 further includes informing means 17 in an operation desk 1 in addition to the same configuration as Embodiment 1. Also, the operation desk 1 can receive a signal from object height distribution data making means 5. In Embodiment 6, if a blind spot for a scanning-type distance meter 109 has occurred and object height distribution data is revised, the object height distribution data making means 5 transmits information about the revision to an operation desk 1. Then, based on the information received from the object height distribution data making means 5, the informing means 17 informs a crane operator that the blind spot for the scanning-type distance meter 109 has occurred and the object height distribution data has being revised, via, for example, lighting of a lamp, a sound, a voice or an image or any combination thereof. In Embodiment 6, it is possible to alert a crane operator in such a manner as described above, enabling further enhancement in safety.

Embodiment 7

Figure 14:
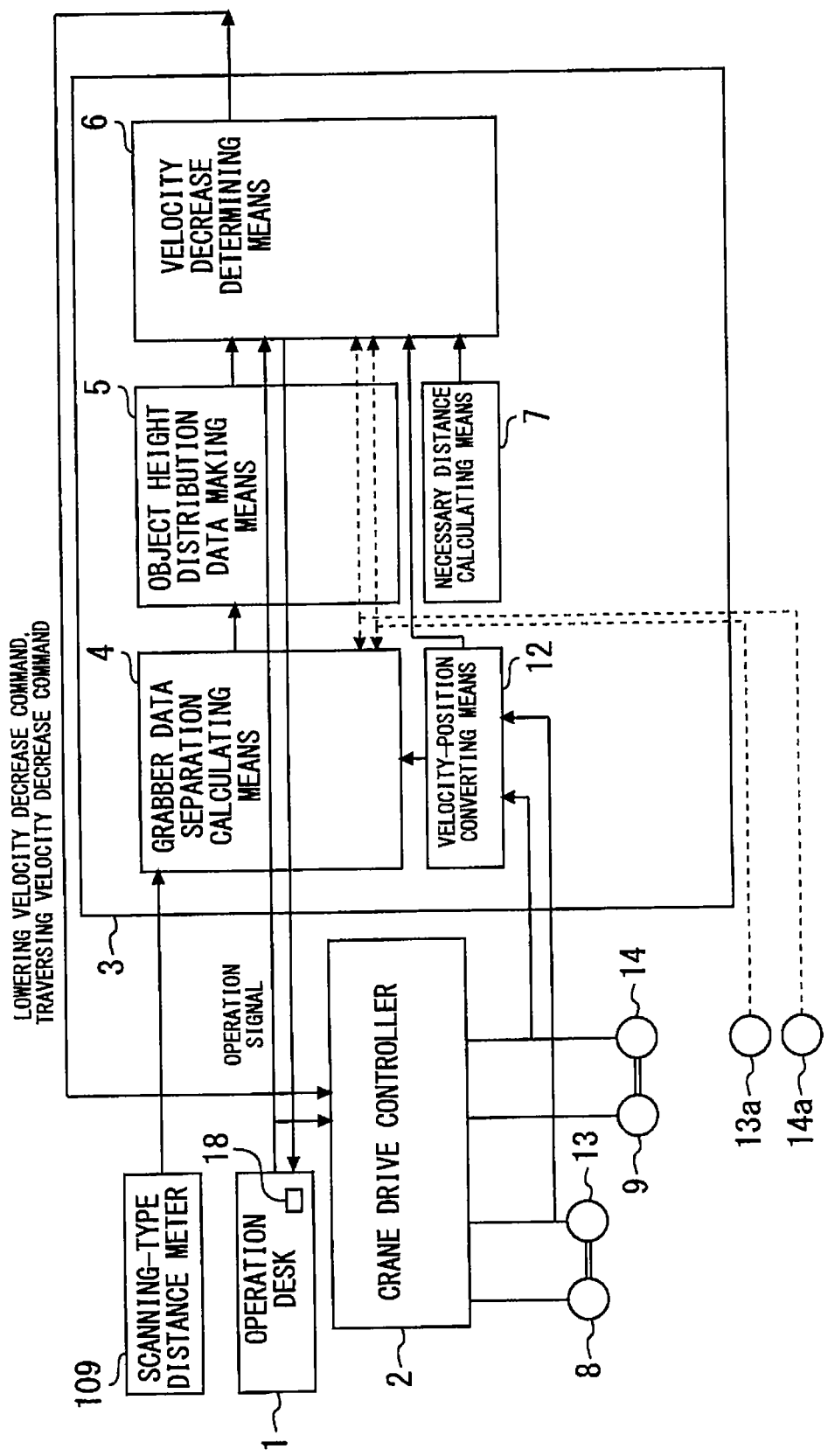
FIG. 14 is a block diagram illustrating a crane control system to which a crane operation assistance system according to Embodiment 7 of the present invention has been applied.

Next, Embodiment 7 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 14 is a block diagram illustrating a crane control system to which a crane operation assistance system according to Embodiment 7 of the present invention has been applied. As illustrated in FIG. 14, Embodiment 7 further includes informing means 18 in an operation desk 1 in addition to the same configuration as Embodiment 1. Also, the operation desk 1 can receive a signal from velocity decrease determining means 6. In Embodiment 7, if the velocity decrease determining means 6 performs an automatic velocity decrease for lowering or traversing, the velocity decrease determining means 6 transmits information about the automatic velocity decrease to an operation desk 1. Then, based on the information received from the velocity decrease determining means 6, the informing means 18 informs a crane operator that the automatic velocity decrease for lowering or traversing is being performed, via, for example, lighting of a lamp, a sound, a voice or an image or any combination thereof. Consequently, in Embodiment 7, when an automatic velocity decrease is performed, a crane operator can promptly know that the automatic velocity decrease is performed.

Embodiment 8

Figure 15:
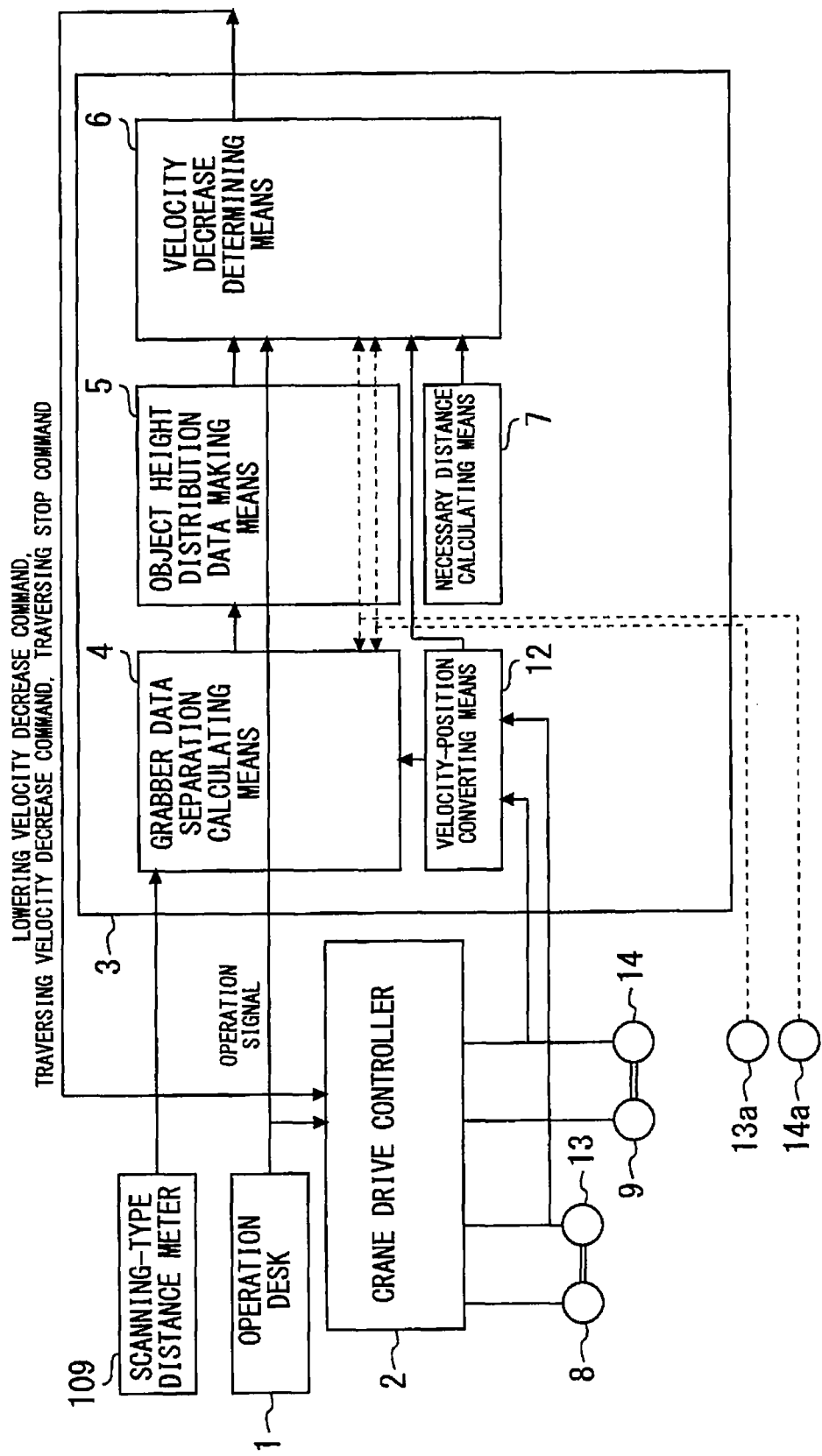
FIG. 15 is a block diagram illustrating a crane control system to which a crane operation assistance system according to Embodiment 8 of the present invention has been applied.

Next, Embodiment 8 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 15 is a block diagram illustrating a crane control system to which a crane operation assistance system according to Embodiment 8 of the present invention has been applied.

In Embodiment 8, as in Embodiment 1, when a movable body 103 is traversing, the velocity decrease determining means 6 issues a traversing velocity decrease command to a crane drive controller 2 to decrease a traversing velocity of the movable body 103 to a creep velocity before a container 108R or a container-grabber 105 collides with an object. Furthermore, in Embodiment 8, if the movable body 103 reaches a position at which the container 108R or the container-grabber 105 hits an object while travelling at the creep velocity, the velocity decrease determining means 6 issues a traversing stop command to the crane drive controller 2 to automatically stop the traversing of the movable body 103. According to Embodiment 8, as a result of such control being performed, a delay in an operation to stop traversing of the movable body 103 by a crane operator can be allowed, enabling further enhancement in safety.

Embodiment 9

Figure 16:
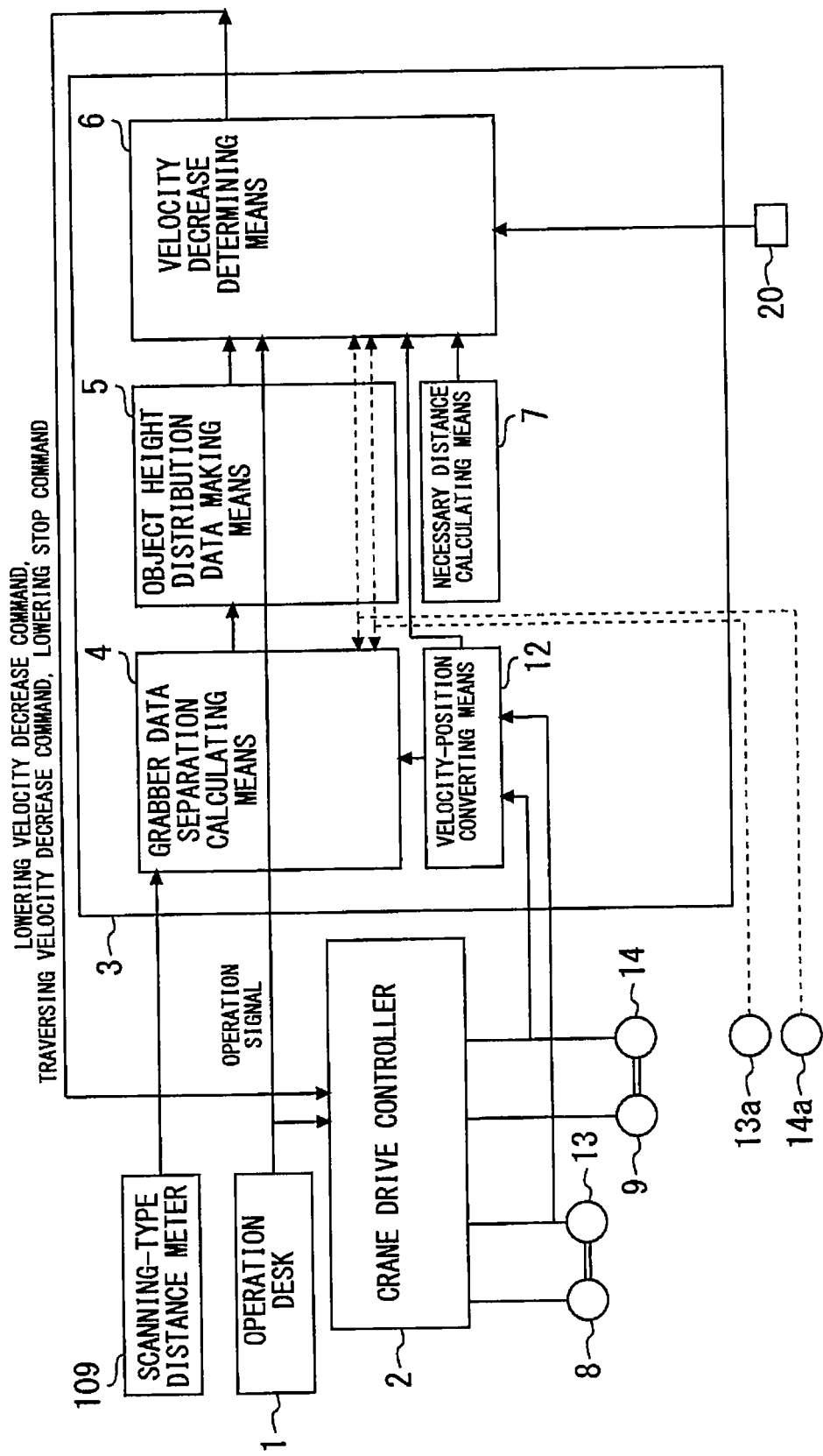
FIG. 16 is a block diagram illustrating a crane control system to which a crane operation assistance system according to Embodiment 9 of the present invention has been applied.

Next, Embodiment 9 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 16 is a block diagram illustrating a crane control system to which a crane operation assistance system according to Embodiment 9 of the present invention has been applied. Embodiment 9 further includes landing detecting means 20 capable of detecting that a container 108R hung from a movable body 103 is landed, in addition to the same configuration as Embodiment 1. The landing detecting means 20 is provided on a container-grabber 105. The landing detecting means 20 can detect a change in size of a gap between a lower surface of the container-grabber 105 and an upper surface of the container 108R. The landing detecting means 20 can detect landing of the container 108R by detecting that the gap has reduced when the container 108R has landed.

In Embodiment 9, as in Embodiment 1, when a container 108R is lowering, velocity decrease determining means 6 issues a lowering velocity decrease command to a crane drive controller 2 to decrease a lowering velocity of the container 108R to a creep velocity before a container 108R collides with an object, that is, is landed. Furthermore, in Embodiment 9, if the landing detecting means 20 detects that the container 108R is landed while lowering at the creep velocity, the velocity decrease determining means 6 issues a lowering stop command to the crane drive controller 2 to automatically stop paying out wire ropes 104. According to Embodiment 9, as a result of such control being performed, a delay in an operation to stop lowering of a container 108R by a crane operator can be allowed, enabling further enhancement in safety.

Embodiment 10

Next, Embodiment 10 of the present invention will be described. The description will be focused mainly on differences from Embodiment 1 described above, and components that are the same as or correspond to those of Embodiment 1 are provided with reference numerals that are the same as those of Embodiment 1 and description thereof will be omitted. FIG. 17 is a block diagram illustrating a crane control system to which a crane operation assistance system according to Embodiment 10 of the present invention has been applied. As illustrated in FIG. 17, Embodiment 10 includes velocity decrease command cancelling means 21 capable of selectively cancelling a lowering velocity decrease command or a traversing velocity decrease command issued from velocity decrease determining means 6 to a crane drive controller 2, and an operation switch 1b provided on an operation desk 1, in addition to the same configuration as Embodiment 1.

Depending on the preference of a crane operator, a function that makes an automatic velocity decrease in a lowering direction or an automatic velocity decrease in a traversing direction may be bothersome to the crane operator. In Embodiment 10, in such case, the crane operator can cancel either or both of the function that makes an automatic velocity decrease in a lowering direction and a function that makes an automatic velocity decrease in a traversing direction by operating the operation switch 1b. Based on a signal from the operation switch 1b, the velocity decrease command cancelling means 21 cancels either or both of a lowering velocity decrease command and a traversing velocity decrease command issued from the velocity decrease determining means 6 to the crane drive controller 2, according to a selection by a crane operator. According to Embodiment 10 described above, either or both of a function that performs an automatic velocity decrease in a lowering direction and a function that performs an automatic velocity decrease in a traversing direction can be cancelled according to the preference of a crane operator. Thus, Embodiment 10 can respond to many different preferences of crane operators.

REFERENCE SIGNS LIST

1 operation desk
1a selection switch
1b operation switch
2 crane drive controller
3 operation assistance controller
4 grabber data separation calculating means
5 object height distribution data making means
6 velocity decrease determining means
7 necessary distance calculating means
8 hoisting motor
9 traverse motor
12 velocity-position converting means
13 lifting/lowering velocity detector
13a height position detector
14 traversing velocity detector
14a movable body position detector
15a container height dimension setting means
15b container height dimension detecting means
16 yard management system
17, 18 informing means
20 landing detecting means
21 velocity decrease command cancelling means
100 crane
101 frame
102 running wheel
103 movable body
104 wire rope
105 container-grabber
107 truck
108, 108Q, 108R container
109 scanning-type distance meter
110 bed
111 operation room
112 wind-up drum

The invention claimed is:

1. A crane operation assistance system for assisting operation of a crane including a movable body capable of hoisting a container and moving in a horizontal direction, the system comprising:
    a scanning-type distance meter mounted on the movable body, the scanning-type distance meter being capable of measuring a distance and an angle between the scanning-type distance meter and an object under a range of movement of the movable body; and
    a controller that is programmed to:
    lower the container into an imaginary containers presence zone that includes a container storage space able to accommodate the container;
    make, based on information measured by the scanning-type distance meter, object height distribution data that is data indicating a distribution of heights of objects under the range of movement of the movable body; and
    revise, if a blind spot for the scanning-type distance meter has occurred in the made object height distribution data, data of object heights in a zone of the blind spot,
    wherein the revised data of the object heights is based on data of an object height at a point that is farthest from the scanning-type distance meter in the imaginary containers presence zone having an overlap with the zone of the blind spot.

2. The crane operation assistance system according to claim 1, wherein the controller is programmed to revise the data of the object heights in the zone of the blind spot uniformly to a value equal to the object height at the farthest point.

3. The crane operation assistance system according to claim 1, wherein the controller is programmed to decrease a lowering velocity of the container or a container-grabber that is lowering while being hung from the movable body, before the container or the container-grabber collides with an object, based on the object height distribution data.

4. The crane operation assistance system according to claim 3, wherein the controller is programmed to:
  set a maximum value for a height dimension of the container; and
  determine a position for a start of the velocity decrease by calculating, based on the set maximum value, a position of a lower surface of the container hung from the movable body.

5. The crane operation assistance system according to claim 3, wherein the controller is programmed to:
  detect a height dimension of the container hung from the movable body based on information obtained by measuring, using the scanning-type distance meter, a position of a lower end of the container; and
  determine a position for a start of the velocity decrease by calculating, based on the detected height dimension, a position of a lower surface of the container hung from the movable body.

6. The crane operation assistance system according to claim 3, further comprising a selection switch for allowing a crane operator to select container height dimension information,
  wherein the controller is programmed to determine a position for a start of the velocity decrease by calculating, based on information selected by using the selection switch, a position of a lower surface of the container hung from the movable body.

7. The crane operation assistance system according to claim 3, wherein the controller is programmed to:
  receive container height dimension information from an upper system that provides a container transport instruction; and
  determine a position for a start of the velocity decrease by calculating, based on the received container height dimension information, a position of a lower surface of the container hung from the movable body.

8. The crane operation assistance system according to claim 1, wherein the controller is programmed to decrease a movement velocity of the movable body, before the container or a container-grabber that is moving together with the movable body collides with an object, based on the object height distribution data.

9. The crane operation assistance system according to claim 8, wherein the controller is programmed to:
  set a maximum value for a height dimension of the container; and
  determine a position for a start of the velocity decrease by calculating, based on the set maximum value, a position of a lower surface of the container hung from the movable body.

10. The crane operation assistance system according to claim 8, wherein the controller is programmed to:
  detect a height dimension of the container hung from the movable body based on information obtained by measuring, using the scanning-type distance meter, a position of a lower end of the container; and
  determine a position for a start of he velocity decrease by calculating, based on the detected height dimension, a position of a lower surface of the container hung from the movable body.

11. The crane operation assistance system according to claim 8, further comprising a selection switch for allowing a crane operator to select contain height dimension information,
  wherein the controller is programmed to determine a position for a start of the velocity decrease by calculating, based on information selected by using the selection switch, a position of a lower surface of the container hung from the movable body.

12. The crane operation assistance system according to claim 8, wherein the controller is programmed to:
  receive container height dimension information from an upper system that provides a container transport instruction; and
  determine a position for a start of the velocity decrease by calculating, based on the received container height dimension information, a position of a lower surface of the container hung from the movable body.

* * * * *